US012793634B2

(12) United States Patent
Kim

(10) Patent No.: US 12,793,634 B2
(45) Date of Patent: Nov. 10, 2026

(54) DISPLAY DEVICE

(71) Applicant: LG Display Co., Ltd., Seoul (KR)

(72) Inventor: Jaehyoung Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/817,622

(22) Filed: Aug. 28, 2024

(65) Prior Publication Data

US 2025/0104629 A1 Mar. 27, 2025

(30) Foreign Application Priority Data

Sep. 27, 2023 (KR) ........................ 10-2023-0130930

(51) Int. Cl.

| | |
|---|---|
| ***G09G 3/3233*** | (2016.01) |
| ***G06F 3/041*** | (2006.01) |
| ***G09G 3/3266*** | (2016.01) |
| ***G09G 3/3275*** | (2016.01) |

(52) U.S. Cl.

CPC ......... *G09G 3/3233* (2013.01); *G09G 3/3275* (2013.01); *G06F 3/0412* (2013.01); *G09G 3/3266* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2320/041* (2013.01);

(Continued)

(58) Field of Classification Search

None

See application file for complete search history.

(56) References Cited

U.S. PATENT DOCUMENTS

| | | | |
|---|---|---|---|
| 11,417,295 | B2 | 8/2022 | Glen |
| 11,763,778 | B2 | 9/2023 | Glen |
| 12,142,187 | B2 | 11/2024 | Kim et al. |

(Continued)

FOREIGN PATENT DOCUMENTS

| | | | |
|---|---|---|---|
| KR | 10-2019-0070040 | A | 6/2019 |
| KR | 10-2021-0050626 | A | 5/2021 |

(Continued)

OTHER PUBLICATIONS

Office Action issued on Dec. 9, 2024 in Korean Patent Application No. 10-2023-0130930.

(Continued)

*Primary Examiner* — Christopher R Lamb

(74) *Attorney, Agent, or Firm* — Morgan, Lewis & Bockius LLP

(57) ABSTRACT

A display device may include: a display panel including a display area in which pixels are disposed, and a non-display area around the display area; a light-emission control driver configured to receive a first start signal and a first clock signal and to supply a light-emission control signal to the display panel; at least one scan driver configured to receive a second start signal and a second clock signal and to supply a scan signal to the display panel; and a controller configured to control the display panel to separately operate in a refresh period or a hold period based on a refresh rate. The hold period may have a portion for which each of the first and second start signals may be output at a fixed voltage level. Each of the first and clock signals may continuously toggle in each of the refresh period and the hold period.

29 Claims, 12 Drawing Sheets

(52) U.S. Cl.
CPC . *G09G 2340/0435* (2013.01); *G09G 2354/00* (2013.01)

(56) References Cited

U.S. PATENT DOCUMENTS

| | | | | |
|---|---|---|---|---|
| 2007/0013634 | A1 | 1/2007 | Saiki et al. | |
| 2008/0002803 | A1* | 1/2008 | Kim | G09G 3/3674 377/64 |
| 2013/0120346 | A1* | 5/2013 | Chung | G09G 3/20 345/212 |
| 2014/0111495 | A1* | 4/2014 | Iwase | G09G 3/3696 327/109 |
| 2016/0189794 | A1* | 6/2016 | Lou | G09G 3/3266 345/100 |
| 2018/0329544 | A1* | 11/2018 | Yeh | G06F 3/0443 |
| 2021/0125559 | A1* | 4/2021 | Park | H10K 59/1213 |
| 2022/0358884 | A1* | 11/2022 | Chae | G09G 3/3233 |
| 2022/0358889 | A1 | 11/2022 | Kim et al. | |
| 2024/0164163 | A1* | 5/2024 | Kim | H10K 59/124 |

FOREIGN PATENT DOCUMENTS

| | | | |
|---|---|---|---|
| KR | 10-2022-0093764 | A | 7/2022 |
| KR | 10-2022-0151434 | A | 11/2022 |
| KR | 10-2023-0049649 | A | 4/2023 |
| KR | 10-2023-0072481 | A | 5/2023 |

OTHER PUBLICATIONS

Office Action dated Aug. 28, 2025 in Korean Patent Application No. 10-2023-0130930 (Note: KR 10-2019-0070040 A was previously cited).

* cited by examiner

DISPLAY DEVICE

CROSS-REFERENCE TO RELATED APPLICATIONS

This application claims priority to Korean Patent Application No. 10-2023-0130930 filed on Sep. 27, 2023 in the Korean Intellectual Property Office, and all the benefits accruing therefrom under 35 U.S.C. 119. The entire contents of the foregoing application are incorporated herein by reference for all purposes.

BACKGROUND

1. Technical Field

The present disclosure relates to a display device, and particularly to, for example, without limitation, a display device using a VRR (variable refresh rate) mode in which an operation condition is changed based on an operation frequency to improve operation stability in a high temperature or high humidity environment.

2. Description of Related Art

A display device using a light-emitting element such as an organic light-emission diode may operate at various operation frequencies.

Recently, as one of various functions required in the display device, VRR (Variable Refresh Rate) is required. The VRR mode is a technique where the display device operates at a constant frequency and increases a refresh rate when high-speed operation is required. In the VRR mode, the refresh rate is lowered when lower power consumption or low-speed operation is required.

When operating at a low frequency for a long period of time, a signal pad defect may occur due to moisture infiltration in a high temperature or high humidity environment, resulting in signal abnormality. Accordingly, there is a demand for a display device that performs stable operation even in the high temperature or high humidity environment.

The description of the related art should not be assumed to be prior art merely because it is mentioned in or associated with this section. The description of the related art includes information that describes one or more aspects of the subject technology, and the description in this section does not limit the invention.

SUMMARY

A purpose of the present disclosure is to provide a display device using a VRR (variable refresh rate) mode in which an operation condition is changed based on an operation frequency to improve operation stability in a high temperature or high humidity environment.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

In order to achieve the above purpose, a display device according to one aspect of the present disclosure includes a display panel including a display area in which a plurality of pixels are disposed, and a non-display area disposed around the display area; a light-emission control driver configured to receive a first start signal and a first clock signal and to supply a light-emission control signal to the display panel; at least one scan driver configured to receive a second start signal and a second clock signal and to supply a scan signal to the display panel; and a controller configured to control the display panel to separately operate in a refresh period or a hold period based on a refresh rate, wherein the hold period has a portion for which each of the first start signal and the second start signal is for being output at a fixed voltage level, wherein each of the first clock signal and the second clock signal is to continuously toggle in each of the refresh period and the hold period.

The display device according to an example embodiment of the present disclosure controls each of the start signal and the clock signal applied to the gate driver, such that in a low-speed operation, the display device operates stably even in the high temperature or high humidity environment.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure.

Figure 1:
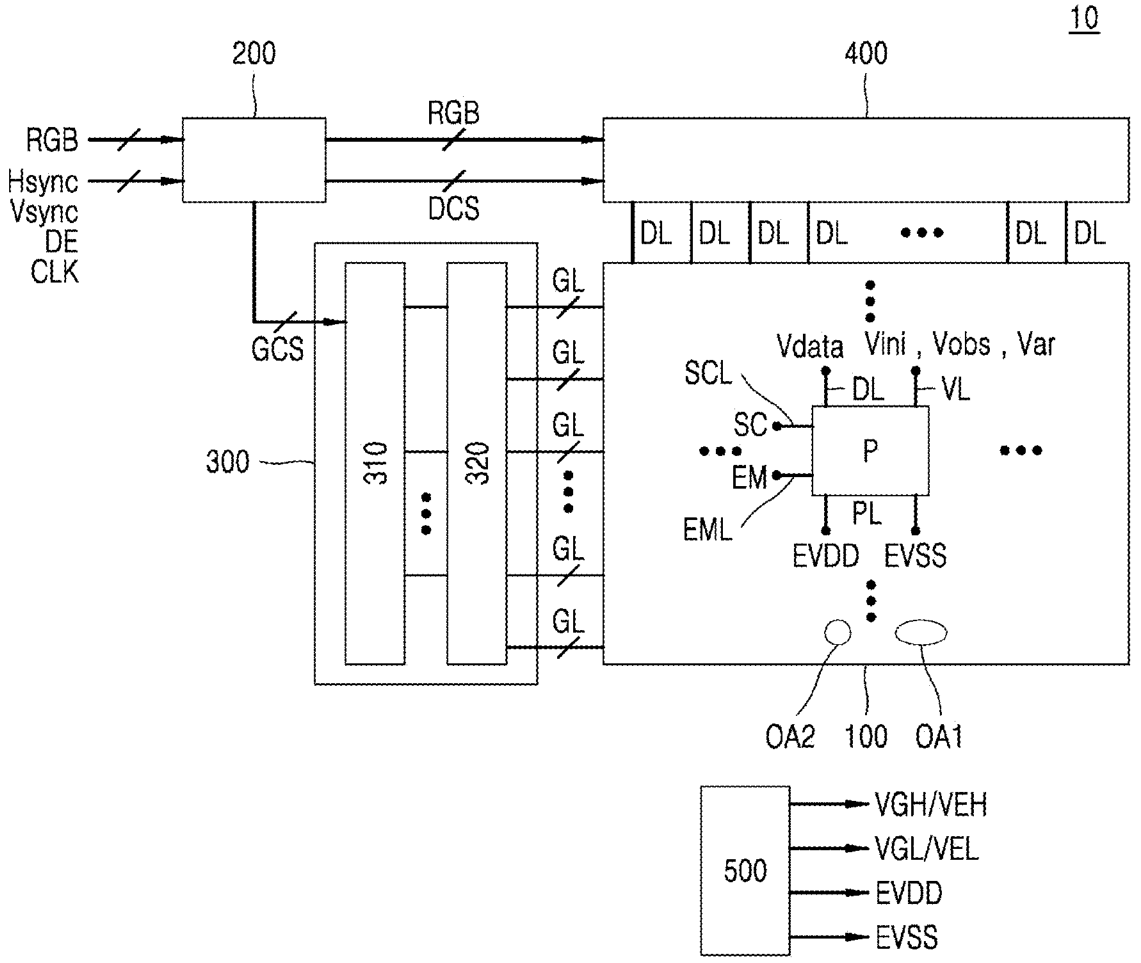
FIG. 1 is a block diagram schematically showing a display device according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and embodiments of the present disclosure are not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/of" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

The notation "/" may indicate "of". The phrase "source/drain electrode" may denote source or drain electrode.

In addition, it will also be understood that when a first element or layer is referred to as being present "on" a second element or layer, the first element may be disposed directly on the second element or layer or may be disposed indirectly on the second element or layer with a third element or layer being disposed between the first and second elements or layers. It will be understood that when an element or layer is referred to as being "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events using terms such as "after," "subsequent to," "before," etc., another event may occur therebetween unless "directly after," "directly subsequent" or "directly before" is indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first," "second," "third," and so on may be used herein to describe various elements, components, regions, layers and/or periods, these elements, components, regions, layers and/or periods should not be limited by these terms. These terms are used to distinguish one element, component, region, layer or period from another element, component, region, layer or period. Thus, a first element, component, region, layer or period as described under could be termed a second element, component, region, layer or period, without departing from the spirit and scope of the present disclosure.

The features of the various embodiments of the present disclosure may be partially or entirely combined with each other, and may be technically associated with each other or operate with each other. The embodiments may be implemented independently of each other or may be implemented together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects," and the like should not be construed such that any aspect or design as described is superior to or advantageous over other aspects or designs.

Further, the term "or" means "inclusive or" rather than "exclusive or". That is, unless otherwise stated or clear from the context, the expression that "x uses a or b" means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description herein. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase "immediately transferred" or "directly transferred" is used.

Hereinafter, a display device according to some embodiments will be described.

FIG. 1 is a block diagram schematically showing a display device according to an example embodiment of the present disclosure.

Referring to FIG. 1, a display device 10 includes a display panel 100 including a plurality of pixels P, a controller 200, and a gate driver 300 that supplies a gate signal to each of the plurality of pixels P, a data driver 400 that supplies a data signal to each of the plurality of pixels P, and a power supply 500 that supplies power required for operation to each of the plurality of pixels P.

The display panel 100 includes a display area (AA, see FIG. 2) where the pixel P is located, and a non-display area (NA, see FIG. 2) surrounding the display area AA. The gate driver 300 and the data driver 400 are disposed in the non-display area NA.

In the display panel 100, a plurality of gate lines GL and a plurality of data lines DL intersect each other, and each of the plurality of pixels P are connected to the gate line GL and the data line DL. Specifically, one pixel P receives the gate signal from the gate driver 300 via the gate line GL, receives the data signal from the data driver 400 via the data line DL, and receives a high potential driving voltage EVDD and a low potential driving voltage EVSS from the power supply 500 via a driving power line PL.

In this regard, the gate line GL supplies a scan signal SC and a light-emission control signal EM to the pixel and the data line DL supplies a data voltage Vdata to the pixel. Furthermore, according to various embodiments, the gate line GL may include a plurality of scan lines SCL that supply the scan signal SC and a light-emission control signal line EML that supplies the light-emission control signal EM. Furthermore, the plurality of pixels P may additionally include the at least one power line VL and may receive a bias voltage Vobs, and an initialization voltage Vini and Var via the at least one power line VL.

Figure 2:
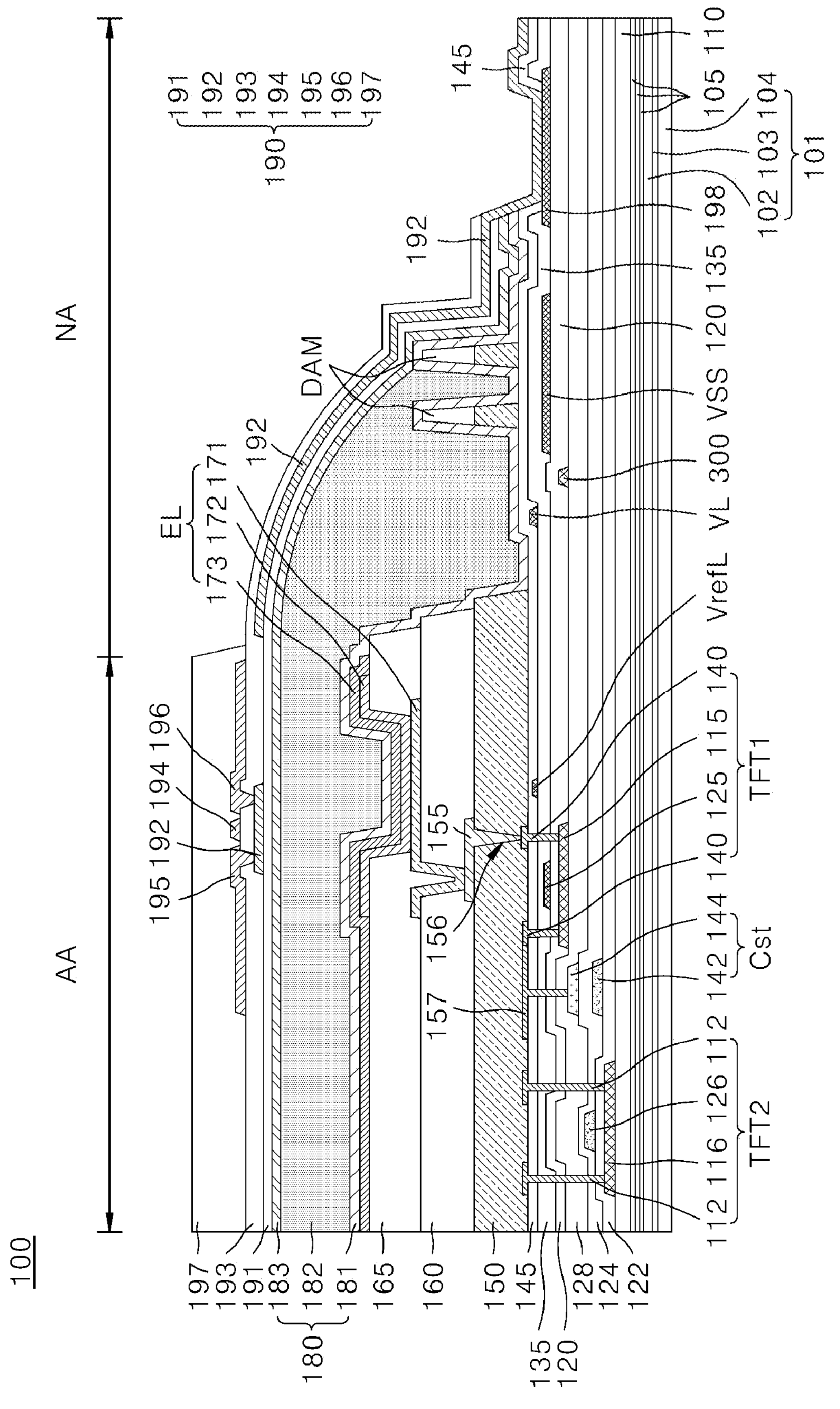
FIG. 2 is a cross-sectional view showing a stack structure of a display device according to an example embodiment of the present disclosure.

Furthermore, as shown in FIG. 2, each pixel P includes a light-emitting element EL and a pixel circuit that controls an operation of the light-emitting element EL. In this regard, the light-emitting element EL is composed of an anode electrode 171, a cathode electrode 173, and a light-emitting layer 172 between the anode electrode 171 and the cathode electrode 173.

The pixel circuit includes a plurality of switching elements, a driving element, and a capacitor. In this regard, each of the switching element and the driving element may be embodied as a thin-film transistor. In the pixel circuit, the driving element controls an amount of current supplied to the light-emitting element EL based on the data voltage to adjust an amount of light emitted from the light-emitting element EL. Furthermore, the plurality of switching elements receives the scan signal SC supplied via the plurality of scan lines SCL and the light-emission control signal EM supplied via the light-emission control line EML and operates the pixel circuit based on the scan signal SC and the light-emission control signal EM.

The display panel 100 may be embodied as a non-transmissive display panel or a transmissive display panel. The transmissive display panel may be applied to a transparent display device where an image is displayed on a screen and a real object in a background is visible to a viewer in front of the display device. The display panel 100 may be manufactured as a flexible display panel. The flexible display panel may be embodied as an OLED panel using a plastic substrate.

The pixels P may include a red pixel, a green pixel, and a blue pixel to emit light of corresponding colors. The pixels P may further include a white pixel. Each of the pixels P includes a pixel circuit.

Touch sensors may be disposed on the display panel 100. Touch input may be sensed using separate touch sensors or may be sensed through the pixels P. The touch sensors may be disposed on the screen of the display panel in an on-cell type or add-on type or may be embodied as in-cell type touch sensors built into the display panel 100.

The controller 200 processes image data RGB input from an external source such as a host system so as to be adapted to a size and a resolution of the display panel 100 and supplies the processed image data to the data driver 400. The controller 200 generate a gate control signal GCS and a data control signal DCS based on synchronization signals, for example, a dot clock signal CLK, a data enable signal DE, a horizontal synchronization signal Hsync, and a vertical synchronization signal Vsync input from the external source, and supplies the generated gate control signal GCS and data control signal DCS to the gate driver 300 and the data driver 400, respectively, thereby controlling the gate driver 300 and the data driver 400.

The controller 200 may be configured to be coupled to various processors, for example, a microprocessor, a mobile processor, an application processor, etc., depending on a type of a device on which the controller is mounted.

The host system may be any one of a television (TV) system, a set top box, a navigation system, a personal computer (PC), a home theater system, a mobile device, a wearable device, and a vehicle system.

The controller 200 multiplies an input frame frequency by i and controls an operation timing of each of the gate driver 300 and the data driver 400 using a frame frequency=the input frame frequency×i (i is a positive integer greater than 0) Hz. The input frame frequency is 60 Hz in the National Television Standards Committee (NTSC) scheme and is 50 Hz in the Phase-Alternating Line (PAL) scheme.

The controller 200 generates a signal so that the pixel may operate at various refresh rates. That is, the controller 200 generates operation-related signals such that the pixel may operate in a Variable Refresh Rate (VRR) mode, or a refresh rate thereof may be switchable to between a first refresh rate and the second refresh rate. For example, the controller 200 may simply change a rate of a clock signal, may generate a synchronization signal to generate a horizontal blank or a vertical blank, or may operate the gate driver 300 in a mask manner such that the pixel P may operate at various refresh rates.

The controller 200 generates, based on the timing signals Vsync, Hsync, and DE received from the host system, the gate control signal GCS for controlling the operation timing of the gate driver 300, and the data control signal DCS for controlling the operation timing of the data driver 400. The controller 200 controls the operation timings of the gate driver 300 and the data driver 400 to synchronize the gate driver 300 and the data driver 400 with each other.

A level shifter (not shown) converts a voltage level of the gate control signal GCS output from the controller 200 into a gate on voltage VGL and VEL and a gate off voltage VGH and VEH which in turn are supplied to the gate driver 300 via the driving power line PL. The level shifter converts a low level voltage of the gate control signal GCS to a gate low voltage VGL, and converts a high level voltage of the gate control signal GCS to a gate high voltage VGH. The gate control signal GCS includes a start pulse and a shift clock.

The gate driver 300 supplies the scan signal SC to the gate line GL according to the gate control signal GCS supplied from the controller 200. The gate driver 300 may be disposed at one side or each of both opposing sides of the display panel 100 and in a GIP (Gate In Panel) manner.

The gate driver 300 sequentially outputs the gate signal to the plurality of gate lines GL under control of the controller 200. The gate driver 300 may shift the gate signal using a shift register and sequentially supply the shifted gate signal to the gate lines GL.

The gate signal may include the scan signal SC and the light-emission control signal EM in an organic light-emitting display device. The scan signal SC includes a scan pulse swinging between the gate on voltage VGL and the gate off voltage VGH. The light-emission control signal may include a light-emission control signal pulse that swings between the gate on voltage VEL and the gate off voltage VEH.

The scan pulse is synchronized with the data voltage Vdata to select pixels of a line to which data is to be written. The light-emission control signal defines a light-emitting time of each of pixels.

The gate driver 300 may include a light-emission control driver 310 and at least one scan driver 320.

The light-emission control driver 310 outputs the light-emission control signal pulse in response to the start pulse and the shift clock received from the controller 200 and sequentially shifts the light-emission control signal pulse according to the shift clock timing.

Each of the at least one scan driver 320 outputs the scan pulse in response to the start pulse and the shift clock received from the controller 200, and shifts the scan pulse according to a shift clock timing.

The data driver 400 converts the image data RGB into the data voltage Vdata according to the data control signal DCS supplied from the controller 200, and supplies the converted data voltage Vdata to the pixel P via the data line DL.

In FIG. 1, it is illustrated that one data driver 400 is disposed at one side of the display panel 100. However, the number and a position of the data drivers 400 are not limited thereto.

That is, the data driver 400 may be embodied as a plurality of integrated circuits (ICs) which may be disposed at one side of the display panel 100 and may be separately arranged along the one side.

The power supply 500 generates direct current (DC) power necessary for operating a pixel array of the display panel 100 and the display panel driver including the gate driver 300 and the data driver 400 using a DC-DC converter. The DC-DC converter may include a charge pump, a regulator, a buck converter, a boost converter, etc. The power supply 500 receives a DC input voltage applied from the host system (not shown) and generates DC voltages such as the gate on voltage VGL and VEL, the gate off voltage VGH and VEH, the high-potential driving voltage EVDD, the low-potential driving voltage EVSS, etc. The gate on voltage VGL and VEL and the gate off voltage VGH and VEH are supplied to the level shifter (not shown) and the gate driver 300. Each of the high-potential driving voltage EVDD and the low-potential driving voltage EVSS is commonly supplied to the pixels.

Further, referring to FIG. 1, at least one optical area OA1 and OA2 may be disposed in the display area AA.

The at least one optical area OA1 and OA2 may be positioned so as to overlap at least one optical and electronic device, such as a capturing device such as a camera (an image sensor), and a detection sensor such as a proximity sensor and a luminance sensor.

For operation of the optical electronic device, the at least one optical area OA1 and OA2 may have a light transmissive structure and thus may have a transmittance equal to or greater than a predefined value. In other words, the number of pixels P per unit area in at least one optical area OA1 and OA2 may be smaller than the number of pixels P per unit area in a general area of the display area AA except for the at least one optical area OA1 and OA2. That is, a resolution of at least one optical area OA1 and OA2 may be lower than that of the general area of the display area AA.

The light transmissive structure of the at least one optical area OA1 and OA2 may be formed by patterning a cathode electrode in an area where the pixel P is not disposed. At this time, a portion of the cathode electrode to be patterned may be removed using a laser. Alternatively, the cathode electrode may be selectively formed so as to be patterned using a material such as a cathode deposition prevention layer.

Alternatively, the light transmissive structure of the at least one optical area OA1 and OA2 may be formed by forming the light-emitting element EL and the pixel circuit in a separated manner in the pixel P. In other words, the light-emitting element EL of the pixel P may be positioned on the at least one optical area OA1 and OA2, while a plurality of transistors TFT constituting the pixel circuit may be disposed around the at least one optical area OA1 and OA2, and the light-emitting element EL and the pixel circuit may be electrically connected to each other via a transparent metal layer.

FIG. 2 is a cross-sectional view showing a stack structure of a display device according to an example embodiment of the present disclosure.

Referring to FIG. 2, the display panel 100 includes a display area AA where the pixel P is located, and a non-display area NA surrounding the display area AA. The gate driver 300 and the data driver 400 are disposed in the non-display area NA.

The display panel 100 according to an example embodiment of the present disclosure includes a substrate 101, a thin-film transistor TFT1 and TFT2, a bank layer 165, a light-emitting element EL, an encapsulation layer 180, a touch layer 190, a touch protective film 197, a dam DAM, and a pad 198.

The thin-film transistor TFT1 may be disposed on the substrate 101. The thin-film transistor TFT1 drives the light-emitting element EL of the display area AA.

The substrate 101 supports various components of the display panel 100. The substrate 101 may be made of a transparent insulating material, such as glass or plastic. When the substrate 101 is made of plastic, the substrate may be referred to as a plastic film or plastic substrate. For example, the substrate 101 may be in a form of a film including one of polyimide-based polymer, polyester-based polymer, silicone-based polymer, acryl-based polymer, polyolefin-based polymer, and copolymer thereof. However, embodiments of the present disclosure are not limited thereto.

The thin-film transistor TFT1 may include a semiconductor layer 115, a gate electrode 125, and source/drain electrodes 140. The thin-film transistor TFT1 is a driving transistor (T1 in FIG. 4). The semiconductor layer 115 may be made of polysilicon (p-Si). In this case, a predetermined area thereof may be doped with impurities. Furthermore, the semiconductor layer 115 may be made of amorphous silicon a-Si or various organic semiconductor materials such as pentacene. The semiconductor layer 115 may be made of oxide. Embodiments of the present disclosure are not limited to the material constituting the semiconductor layer 115. The semiconductor layer 115 may be an active layer. However, embodiments of the present disclosure are not limited thereto.

The gate electrode 125 may be disposed on top of the semiconductor layer 115. The gate electrode 125 may be made of a variety of conductive materials, such as magnesium (Mg), aluminum (Al), nickel (Ni), chromium (Cr), molybdenum (Mo), tungsten (W), gold (Au) or an alloy thereof, etc. However, embodiments of the present disclosure are not limited thereto.

A gate insulating layer may be disposed between the semiconductor layer 115 and the gate electrode 125. The gate insulating layer may be a layer to insulate the semiconductor layer 115 and the gate electrode 125 from each other, and may be made of an insulating material. For example, the gate insulating layer may be composed of a single or double layer made of silicon oxide (SiOx) or silicon nitride (SiNx). However, embodiments of the present disclosure are not limited thereto.

The source/drain electrodes 140 may be electrically connected to the semiconductor layer 115 and the source electrode and the drain electrode may be spaced apart from each other. The source/drain electrodes 140 may be disposed on the insulating layer. Each of the source/drain electrodes 140 may be made of a conductive material, for example, copper (Cu), aluminum (Al), molybdenum (Mo), titanium (Ti) or an alloy thereof, etc. However, embodiments of the present disclosure are not limited thereto.

The capacitor Cst may be disposed on the substrate 101. The capacitor Cst may include a first gate electrode 142 and a second gate electrode 144. The gate insulating layer 124 may be disposed between the first gate electrode 142 and the second gate electrode 144. At least one of the first gate electrode 142 and the second gate electrode 144 may be connected to the electrode of the thin-film transistor TFT1. The capacitor Cst may be connected to the thin-film transistor TFT1 via a connection electrode 157.

Another thin-film transistor TFT2 may be disposed on the substrate 101. The thin-film transistor TFT2 may include a semiconductor layer 116, a gate electrode 126, and source/drain electrodes 112. The thin-film transistor TFT2 may be one of first to seventh transistors T1 to T7 (in FIG. 4). A gate insulating layer 122 may be disposed between the semiconductor layer 116 and the gate electrode 126.

An interlayer insulating layer 128 may be disposed between the thin-film transistor TFT1 and the capacitor Cst, or between the thin-film transistor TFT1 and another thin-film transistor TFT2.

For convenience of illustration, among the various thin-film transistors that may be included in the display device 10, only the thin-film transistor TFT1 and the thin-film transistor TFT2 are shown. However, other thin-film transistors may be included in the display panel 100. Further, an example in which the thin-film transistor has a coplanar structure is described. However, the thin-film transistor may be implemented to have other structures such as a staggered structure. The present disclosure is not limited thereto.

The thin-film transistor TFT1 may receive the high-potential driving voltage EVDD in response to the data voltage Vdata supplied to the gate electrode 125 of the thin-film transistor TFT1 to control the current amount supplied to the light-emitting element EL to adjust an amount of light emitted from the light-emitting element EL. The thin-film transistor TFT1 may supply a constant current based on a voltage charged in the capacitor Cst to maintain light emission of the light-emitting element EL until the data voltage Vdata of a next frame is supplied thereto. The high-potential supply line may extend in a parallel manner to the data line.

The thin-film transistor TFT1 may include the semiconductor layer 115 disposed on the interlayer insulating layer 128, the gate electrode 125 overlapping the semiconductor layer 115 while a second insulating layer 120 is interposed therebetween, and the source/drain electrodes 140 formed on a third insulating layer 135 and contacting the semiconductor layer 115.

The semiconductor layer 115 may act as an area where a channel is formed during an operation of the thin-film transistor TFT1. The semiconductor layer 115 may be made of an oxide semiconductor, or may be made of various organic semiconductors such as amorphous silicon (a-Si), polycrystalline silicon (poly-Si), or pentacene. The present disclosure is not limited thereto. The semiconductor layer 115 may be formed on the interlayer insulating layer 128. The semiconductor layer 115 may include a channel area, a source area, and a drain area. The channel area may overlap with the gate electrode 125 while the second insulating layer 120 is interposed therebetween. The channel area may be formed between the source and drain electrodes 140. The source area may be electrically connected to the source electrode 140 via a contact hole extending through the second insulating layer 120 and the third insulating layer 135. The drain area may be electrically connected to the drain electrode 140 via a contact hole extending through the second insulating layer 120 and the third insulating layer 135.

A buffer layer 105 and a first insulating layer 110 may be disposed between a semiconductor layer 116 and the substrate 101. The buffer layer 105 may delay diffusion of moisture and/or oxygen invading into the substrate 101. The first insulating layer 110 may protect the semiconductor layer 116 and may block various types of defects introduced from the substrate 101.

The uppermost layer of the buffer layer 105 in contact with the first insulating layer 110 may be made of a material having different etching characteristics from those of each of the remaining layers of the buffer layer 105, the first insulating layer 110, the second insulating layer 120 and the third insulating layer 135. The uppermost layer of the buffer layer 105 contacting the first insulating layer 110 may be made of one of silicon nitride ($SiN_x$) and silicon oxide ($SiO_x$). Each of the remaining layers of the buffer layer 105, the first insulating layer 110, the second insulating layer 120, and the third insulating layer 135 may be made of the other of silicon nitride ($SiN_x$) and silicon oxide ($SiO_x$). For example, the uppermost layer of the buffer layer 105 in contact with the first insulating layer 110 may be made of silicon nitride ($SiN_x$), while each of the remaining layers of the buffer layer 105, the first insulating layer 110, the second insulating layer 120, and the third insulating layer 135 may be made of silicon oxide ($SiO_x$). The present disclosure is not limited thereto.

The gate electrode 125 may be formed on the second insulating layer 120 and may overlap the channel area of the semiconductor layer 115 while the second insulating layer 120 is interposed therebetween. The gate electrode 125 may be made of a first conductive material and may be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. The present disclosure is not limited thereto.

The source electrode 140 may be connected to the exposed source area of the semiconductor layer 115 via the contact hole extending through the second insulating layer 120 and the third insulating layer 135. The drain electrode 140 may be opposite to the source electrode 140 and may be connected to the drain area of the semiconductor layer 115 via the contact hole extending through the second insulating layer 120 and the third insulating layer 135. Each of the source and drain electrodes 140 may be made of a second conductive material and may be embodied as a single layer or multi-layers made of molybdenum (Mo), aluminum (Al), chromium (Cr), gold (Au), titanium (Ti), nickel (Ni), neodymium (Nd), copper (Cu), or an alloy thereof. The present disclosure is not limited thereto.

A connection electrode 155 may be disposed between a first middle layer 150 and a second middle layer 160. The connection electrode 155 may be connected to the drain electrode 140 via a connection electrode contact hole 156 extending through a protective film 145 and the first middle layer 150. The connection electrode 155 may be made of a material having low resistivity and identical to or similar to that of the drain electrode 140. The present disclosure is not limited thereto.

A reference voltage line VrefL may be a sub-power line branched from the reference voltage bus line of the at least one power line VL, and may be disposed in the same layer as a layer of the source/drain electrodes 140 of the thin-film transistor TFT1. Embodiments of the present disclosure are not limited thereto, and the reference voltage line VrefL may be disposed on the interlayer insulating layer 128 or the second insulating layer 120.

The light-emitting element EL including a light-emitting layer 172 may be disposed on a second middle layer 160 and a bank layer 165. The light-emitting element 170 may include an anode electrode 171, at least one light-emitting layer 172 formed on the anode electrode 171, and a cathode electrode 173 formed on the light-emitting layer 172.

The anode electrode 171 may be electrically connected to an exposed portion of the connection electrode 155 disposed on the first middle layer 150 and facing the second middle layer 160 via a contact hole extending through the second middle layer 160.

The anode electrode 171 of each pixel is not covered with the bank layer 165. The bank layer 165 may be made of an opaque material (e.g., black material) to prevent light interference between adjacent pixels. In this case, the bank layer 165 may include a light-shielding material including at least one of color pigment, organic black, and carbon black. The present disclosure is not limited thereto.

The at least one light-emitting layer 172 may be formed on a portion of the anode electrode 171 corresponding to a light-emitting area defined by the bank layer 165. The at least one light-emitting layer 172 may include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer may be based on a light-emitting direction. In addition, the light-emitting layer 172 may include first and second light-emitting stacks facing each other while a charge generating layer is interposed therebetween. In this case, the light-emitting layer 172 of one of the first and second light-emitting stacks may generate blue light, while the light-emitting layer 172 of the other of the first and second light-emitting stacks may generate yellow-green light, so that white light may be generated from a combination of the first and second light-emitting stacks. The white light generated from the combination of the first and second light-emitting stacks may be incident on a color filter positioned above or below the light-emitting layer 172, such that a color image may be realized. In another example, each light-emitting layer 172 may generate each color light corresponding to each pixel without a separate color filter such that a color image may be rendered. For example, the light-emitting layer 172 of a red (R) pixel emits red light, the light-emitting layer 172 of a green (G) pixel emits green light, and the light-emitting layer 172 of a blue (B) pixel emits blue light.

The cathode electrode 173 may be formed to face the anode electrode 171 while the light-emitting layer 172 is disposed therebetween, and may receive the high-potential driving voltage EVDD.

An encapsulation layer 180 may block penetration of external moisture or oxygen into the light-emitting element EL that is vulnerable to external moisture or oxygen. To this end, the encapsulation layer 180 may include at least one inorganic encapsulation layer and at least one organic encapsulation layer. The present disclosure is not limited thereto. In the present disclosure, a structure of the encapsulation layer 180 in which a first encapsulation layer 181, a second encapsulation layer 182, and a third encapsulation layer 183 are sequentially stacked is described by way of example.

The first encapsulation layer 181 is formed on the substrate 101 on which the cathode electrode 173 has been formed. The third encapsulation layer 183 is formed on the substrate 101 on which the second encapsulation layer 182 has been formed. The third encapsulation layer 183 and the first encapsulation layer 181 may surround a top face, a bottom face and a side face of the second encapsulation layer 182. The first encapsulation layer 181 and the third encapsulation layer 183 may minimize or prevent penetration of external moisture or oxygen into the light-emitting element EL. Each of the first encapsulation layer 181 and the third encapsulation layer 183 may be made of an inorganic insulating material that may be deposited at a low temperature, such as silicon nitride ($SiN_x$), silicon oxide ($SiO_x$), silicon oxynitride (SiON), or aluminum oxide ($Al_2O_3$). Each of the first encapsulation layer 181 and the third encapsulation layer 183 is deposited in a low temperature atmosphere. Thus, during a deposition process of the first encapsulation layer 181 and the third encapsulation layer 183, the light-emitting element EL which is vulnerable to a high-temperature atmosphere may be prevented from being damaged.

The second encapsulation layer 182 serves as a shock-absorbing layer to relieve a stress between layers due to bending of the display device 10, and may planarize a step between layers. The second encapsulation layer 182 may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. The present disclosure is not limited thereto. When the second encapsulation layer 182 is formed using an inkjet method, a dam DAM may be disposed to prevent the second encapsulation layer 182 in a liquid state from spreading to an edge of the substrate 101. The dam DAM may be closer to the edge of the substrate 101 than the second encapsulation layer 182 may be. The dam DAM may prevent the second encapsulation layer 182 in the liquid state from spreading to a pad area where a conductive pad disposed at the outermost side of the substrate 101 is disposed.

The dam DAM is designed to prevent diffusion of the second encapsulation layer 182. However, when the second encapsulation layer 182 overflows the dam DAM during a process, the second encapsulation layer 182 as an organic layer may be exposed to an outside, so that moisture or the like may invade the light-emitting element. Therefore, to prevent the invasion, at least ten dams DAM may be stacked.

The dam DAM may be disposed on the interlayer insulating layer disposed on the third insulating layer 135 and in the non-display area NA. However, embodiments of the present disclosure are not limited thereto, and the interlayer insulating layer may be the third insulating layer 135.

Further, the dam DAM, and the first middle layer 150 and the second middle layer 160 may be formed simultaneously. The first middle layer 150, and a lower layer of the dam DAM may be formed simultaneously. The second middle layer 160, and an upper layer of the dam DAM may be formed simultaneously. Thus, the dam DAM may have a double layer structure.

Accordingly, the dam DAM may be made of the same material as that of each of the first middle layer 150 and the second middle layer 160. However, embodiments of the present disclosure are not limited thereto.

The dam DAM may overlap the low-potential driving power line VSS. For example, the low-potential driving power line VSS may be formed in a layer under the dam DAM and in the non-display area NA.

The low-potential driving power line VSS and a gate driver 300 in a form of a gate in panel (GIP) may surround a periphery of the display panel. The low-potential driving power line VSS may be located outwardly of the gate driver 300. Further, the low-potential driving power line VSS may be connected to the anode electrode 171 to apply a common voltage thereto. The gate driver 300 is simply illustrated in plan and cross-sectional views. However, the gate driver 300 may be configured using a thin-film transistor TFT having the same structure as that of the thin-film transistor TFT of the display area AA.

The low-potential driving power line VSS is disposed outwardly of the gate driver 300. The low-potential driving power line VSS is disposed outwardly of the gate driver 300 and surrounds the display area AA. The low-potential driving power line VSS may be made of the same material as that of each of the source and drain electrodes 140 of the thin-film transistor TFT1. The present disclosure is not limited thereto. For example, the low-potential driving power line VSS may be made of the same material as that of the gate electrode 125.

Further, the low-potential driving power line VSS may be electrically connected to the anode electrode 171. The low-potential driving power line VSS may supply the low-potential driving voltage EVSS to the plurality of pixels in the display area AA.

The low-potential driving power line VSS may be disposed on the third insulating layer 135. Alternatively, the low-potential driving power line VSS may be disposed on a layer of the source/drain electrodes 140 or the gate electrode 125 of the thin-film transistor TFT1. However, embodiments of the present disclosure are not limited thereto.

The at least one power line VL may be disposed between the gate driver 300 and the display area AA. The at least one power line VL may be disposed in the same layer as a layer of the source/drain electrodes 140 of the thin-film transistor TFT1. However, embodiments of the present disclosure are not limited thereto. The at least one power line VL is shown in a simple manner in the cross-sectional view. However, the initialization voltage bus line ViniL (see FIG. 6) and the reference voltage bus line VrefL may be arranged side by side and may be disposed in the same layer. Alternatively, the initialization voltage bus line ViniL and the reference voltage bus line VrefL may be disposed in different layers in an overlapping or non-overlapping manner. The initialization voltage bus line ViniL may supply the second initialization voltage Vini to the plurality of pixels in the display area AA. The reference voltage bus line VrefL may supply the reference voltage Vref to the plurality of pixels in the display area AA. The at least one power line VL is illustrated as being disposed between gate driver 300 and the display area AA. However, embodiments of the present disclosure are not limited thereto.

A touch layer 190 may be disposed on the encapsulation layer 180. In the touch layer 190, a touch buffer film 191 may be positioned between a touch sensor metal including touch electrode connection lines 192 and 194 and touch electrodes 195 and 196 and the cathode electrode 173 of the light-emitting element EL.

The touch buffer film 191 may prevent chemical (developer, etchant, etc.) used in a manufacturing process of the touch sensor metal disposed on the touch buffer film 191 or moisture from the outside from invading the light-emitting layer 172 including an organic material. Accordingly, the touch buffer film 191 may prevent damage to the light-emitting layer 172 as vulnerable to the chemicals or moisture.

The touch buffer film 191 may be made of an organic insulating material that may be formed at a low temperature below or equal to a certain temperature (e.g., 100 degrees Celsius) to prevent damage to the light-emitting layer 172 including the organic material vulnerable to a high temperature, and that has a low dielectric constant of 1 to 3. For example, the touch buffer film 191 may be made of an acryl-based, epoxy-based, or siloxane-based material. The touch buffer film 191 made of the organic insulating material and having planarization performance may prevent damage to the encapsulation layer 180 and fracture of the touch sensor metal formed on the touch buffer film 191 due to bending of the organic light-emitting display device.

According to a mutual-capacitance-based touch sensor structure, the touch electrodes 195 and 196 may be disposed on the touch buffer film 191, and the touch electrodes 195 and 196 may be disposed to intersect each other.

The touch electrode connection lines 192 and 194 may electrically connect the touch electrodes 195 and 196 to each other. The touch electrode connection lines 192 and 194 and the touch electrodes 195 and 196 may be positioned on different layers while the touch insulating film 193 is interposed therebetween.

The touch electrode connection lines 192 and 194 may overlap the bank layer 165, thereby preventing an aperture ratio from being lowered.

In one example, a portion of the touch electrode connection line 192 may extend along upper and side surfaces of the encapsulation layer 180 and upper and side surfaces of the dam DAM and then may be electrically connected to a touch driver circuit (not shown) via a pad 198. Thus, the touch electrodes 195 and 196 may be electrically connected to the touch driver circuit.

The portion of the touch electrode connection line 192 may receive a touch driving signal from the touch driver circuit and transmit the same to the touch electrodes 195 and 196, and may receive a touch sensing signal from the touch electrodes 195 and 196 and may transmit the same to the touch driver circuit.

A touch protective film 197 may be disposed on the touch electrodes 195 and 196. In the drawing, it is shown that the touch protective film 197 is disposed only on the touch electrodes 195 and 196. However, embodiments of the present disclosure are not limited thereto. The touch protective film 197 may extend to an inner end or an outer end of the dam DAM and thus may also be disposed on the touch electrode connection line 192.

Further, a color filter (not shown) may be further disposed on the encapsulation layer 180, and the color filter may be positioned on the touch layer 190 or between the encapsulation layer 180 and the touch layer 190.

Figure 3A:
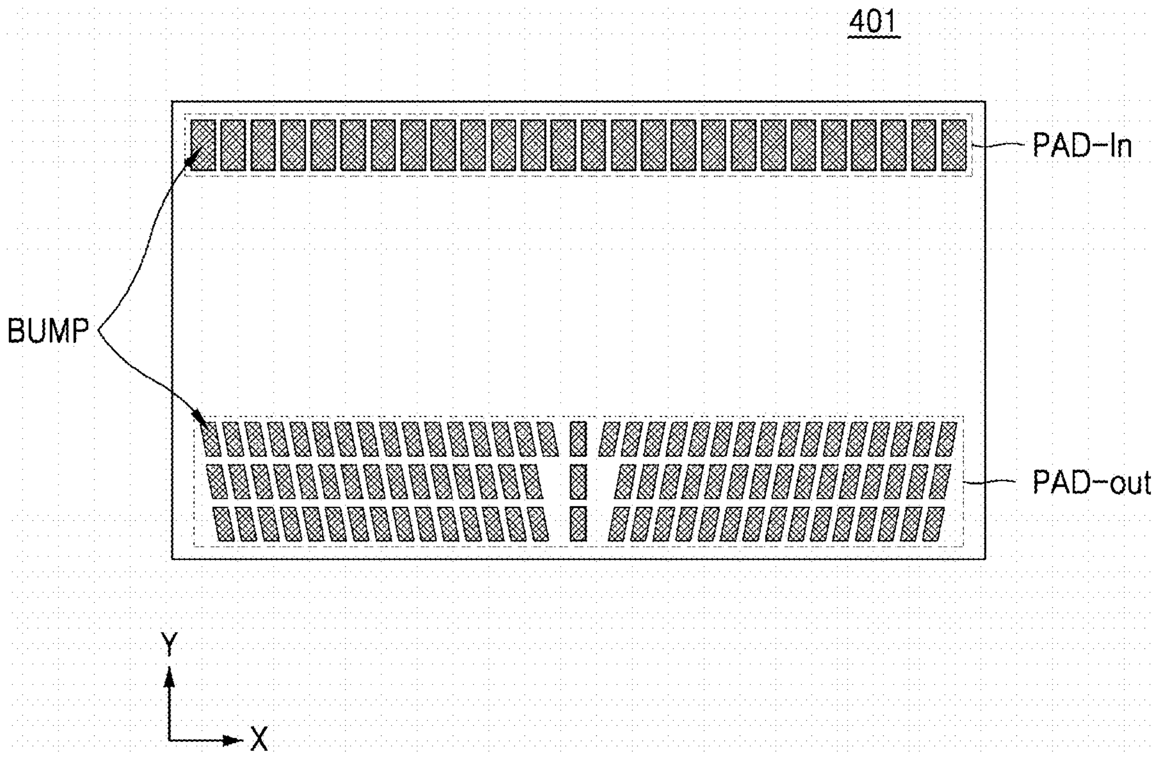
FIG. 3A is a bottom plan view of an IC package according to an example embodiment of the present disclosure.
Figure 3B:
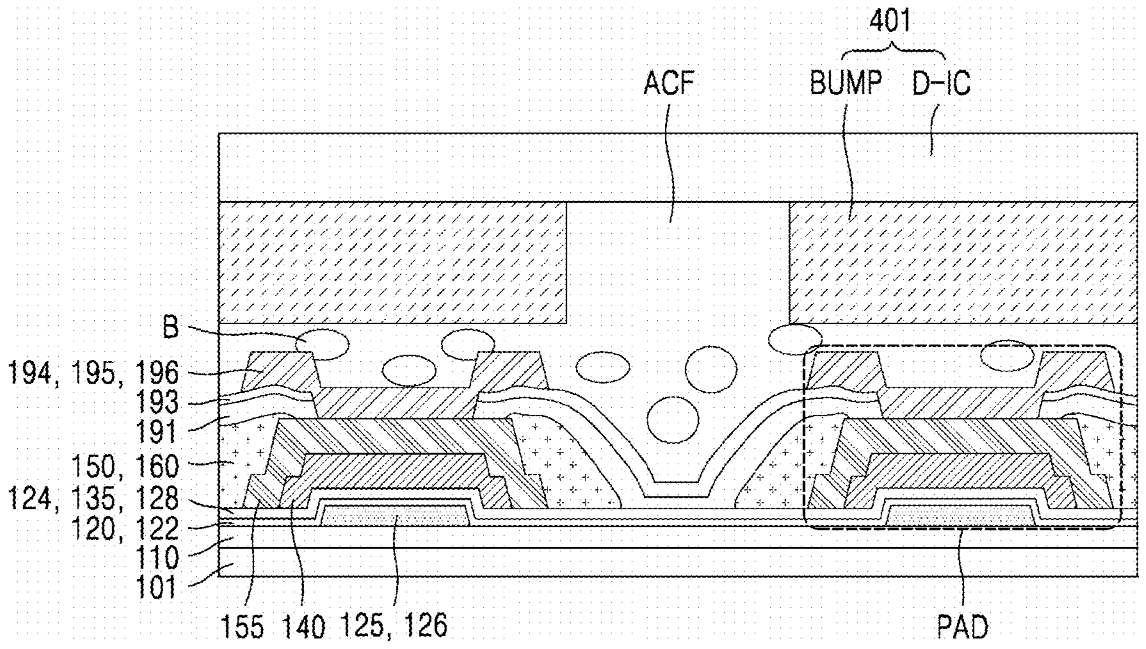
FIG. 3B is a cross-sectional view showing an output bump disposed in an output bump area of FIG. 3A.
Figure 3C:
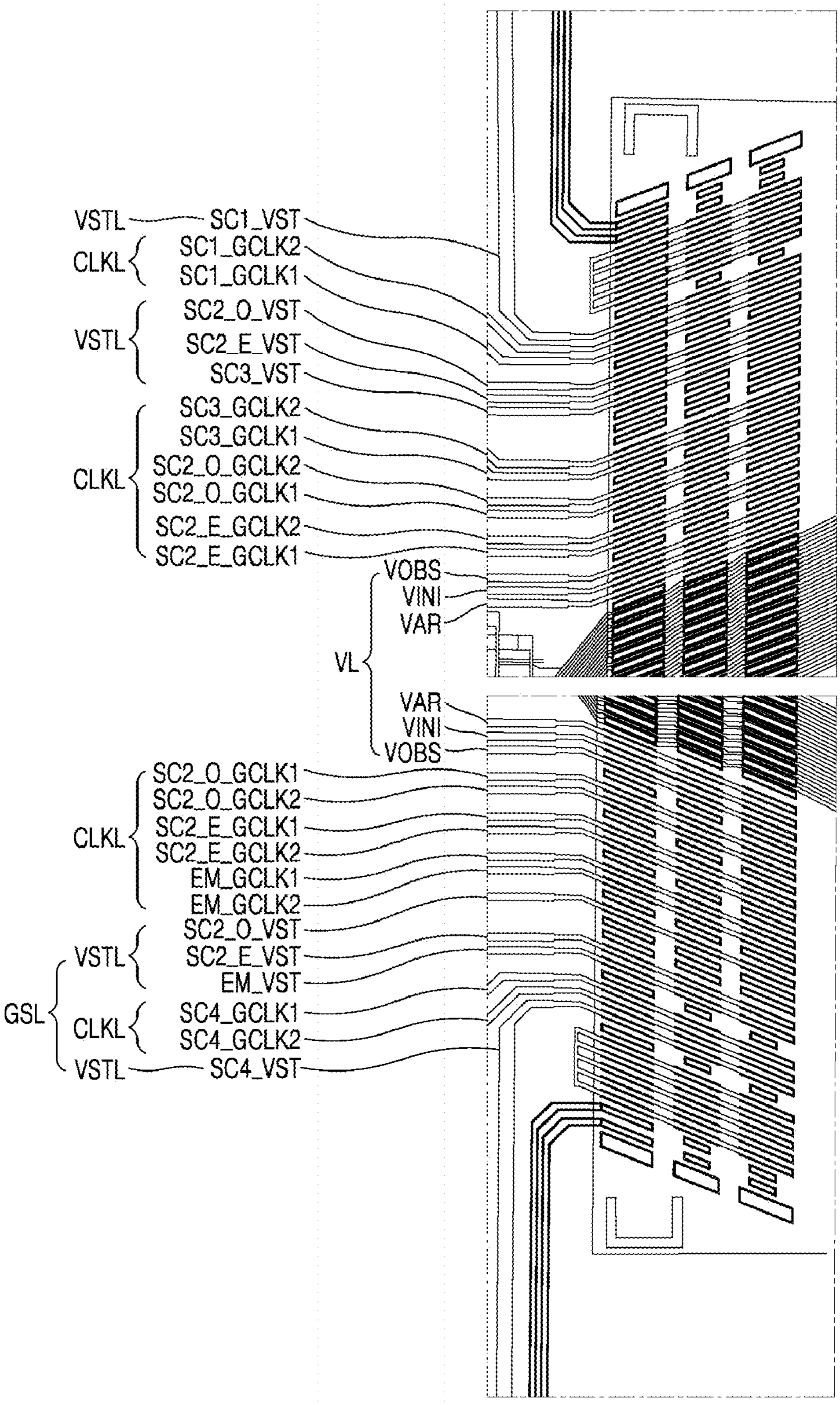
FIG. 3C is an enlarged view of the output bump area of FIG. 3A.

FIG. 3A is a bottom plan view showing an IC package according to an example embodiment of the present disclosure, FIG. 3B is a cross-sectional view showing an output bump disposed in an output bump area of FIG. 3A, and FIG. 3C is an enlarged view of the output bump area of FIG. 3A.

Referring to FIG. 3A, an IC package 401 includes an input bump area PAD-In and an output bump area PAD-Out spaced, by a predetermined distance, from the input bump area PAD-In.

The input bump area PAD-In is located on top of the IC package 401 in a second direction Y. The input bump area PAD-In includes a plurality of bumps BUMP. The plurality of bumps BUMP transmits an input signal from a circuit board to an integrated circuit of the IC package 401. The plurality of bumps BUMP may be arranged in one row in a first direction X as shown in FIG. 3A. However, embodiments of the present disclosure are not limited thereto.

The output bump area PAD-Out is located under the IC package 401 in the second direction Y. The output bump area PAD-Out includes a plurality of bumps BUMP. The plurality of bumps BUMP transmit a signal output from the integrated circuit of the IC package 401 to the signal lines of the display panel 100. The plurality of bumps BUMP may be arranged in 3 rows in the first direction X as shown in FIG. 3A. However, embodiments of the present disclosure are not limited thereto.

Referring to FIG. 3B, the substrate 101 of the display panel 100 may be a PI (polyimide) film substrate. A plurality of signal pads PAD are formed on the substrate 101.

The IC package 401 includes a D-IC. The IC package 401 includes the plurality of bumps BUMP disposed in the input bump area PAD-In and the output bump area PAD-Out disposed under the D-IC. Each of the plurality of bumps BUMP may be connected to each of the plurality of signal pads PAD via a conductive ball B of an adhesive layer ACF. The plurality of bumps BUMP may be formed to have the same thickness. The data driver 400 may include a plurality of bumps BUMP.

The signal pad PAD connected to each of the plurality of bumps BUMP may include a combination of the same material as that of each of the gate electrode 125 and 126 of the thin-film transistor used in the pixel circuit, the same material as that of the source electrode 140 and the drain electrode 140 of the thin-film transistor used in the pixel circuit, the same material as that of the connection electrode 155, and the same material as that of the touch electrode connection line 194 and touch electrodes 195 and 196. That is, the signal pad PAD may include a gate layer 125 and 126 made of the same material as that of the gate electrode 125 and 126 and disposed in the same layer as a layer thereof, a first source/drain layer 140 made of the same material as that of the source electrode or the drain electrode 140 and disposed in the same layer as a layer thereof, a second source/drain layer 155 made of the same material as that of the connection electrode 155 and disposed in the same layer as a layer thereof, and a touch electrode layer 194, 195, and 196 made of the same material as that of the touch electrode connection line 194 and touch electrodes 195 and 196 and disposed in the same layer as a layer thereof.

The signal pad PAD may be formed in a structure in which the gate layer 125 and 126, the first source and drain layer 140, the second source and drain layer 155, and the touch electrode layer 194, 195 and 196 overlap each other. Each of the plurality of bumps BUMPS may overlap the gate electrode, the first source/drain electrode, the second source/drain electrode, and the touch electrode in the bump area. In this regard, an insulating layer may not be formed between the first source and drain layer 140 and the second source and drain layer 155. Furthermore, the second source and drain layer 155 may be formed to have a width greater than that of the first source and drain layer 140 to cover top and side surfaces of the first source and drain layer 140. In this regard, a first intermediate layer 150 or a second intermediate layer 160 may be formed to cover a side surface and at least a portion of a top surface of the second source and drain layer 155.

Different signals may be respectively applied to the plurality of signal pads PAD, or the same signal may be applied thereto. In other words, at least some of the plurality of bumps BUMP may be electrically connected to each other via the plurality of signal pads PAD.

Referring to FIG. 3C, the gate signal line GSL connected to the gate driver 300 and the plurality of power lines VL may be connected to each of the plurality of signal pads PAD. The gate signal line GSL includes a plurality of start signal lines VSTL and a plurality of clock signal lines CLKL.

The plurality of start signal lines VSTL are respectively connected to the light-emission control driver 310 and the plurality of scan drivers 320 included in the gate driver 300. The plurality of clock signal lines CLKL are respectively connected to the light-emission control driver 310 and the plurality of scan drivers 320 included in the gate driver 300. In other words, at least one start signal line VSTL and at least one clock signal line CLKL may be connected to the light-emission control driver 310. At least one start signal line VSTL and at least one clock signal line CLKL may be connected to each of the plurality of scan drivers 320.

The plurality of clock signal lines CLKL respectively connected to the light-emission control driver 310 and the plurality of scan drivers 320 may be disposed adjacent to each other. For example, a clock signal line connected to the light-emission control driver 310 to apply a first light-emission clock signal EM_GCLK1 and a clock signal line connected to the light-emission control driver 310 to apply a second light-emission clock signal EM_GCLK2 may be disposed adjacent to each other.

At least some of the plurality of start signal lines VSTL respectively connected to the light-emission control driver 310 and each of the scan drivers 320 may be disposed adjacent to each other. For example, a start signal line connected to the second scan driver 322 (see FIG. 6) to apply a second start signal SC2_O_VST and SC2_E_VST and a start signal line connected to the light-emission control driver 310 to apply a light-emission control start signal EM_VST may be adjacent to each other.

The plurality of power lines VL may include the bias voltage bus line VOBS, a first initialization voltage bus line VAR, and a second initialization voltage bus line VINI. The at least one power line VL may be disposed inwardly of the gate signal line GSL. In other words, the signal pad PAD to which the power line VL is connected may be connected to the bump BUMP disposed in a center area of the IC package 401. The first clock signals or the second clock signals may be applied via bumps adjacent to each other, respectively.

In this regard, ones of the plurality of signal pads PAD arranged adjacent to each other may cause defects such as screen abnormity depending on an operation condition. In other words, when the same signal is continuously applied to the signal pads PAD during a hold frame in a low-speed operation, a film lift-off phenomenon may occur. To prevent this situation, the present disclosure presents appropriate operation conditions, which will be described later along with descriptions of FIGS. 6 to 9.

Figure 4:
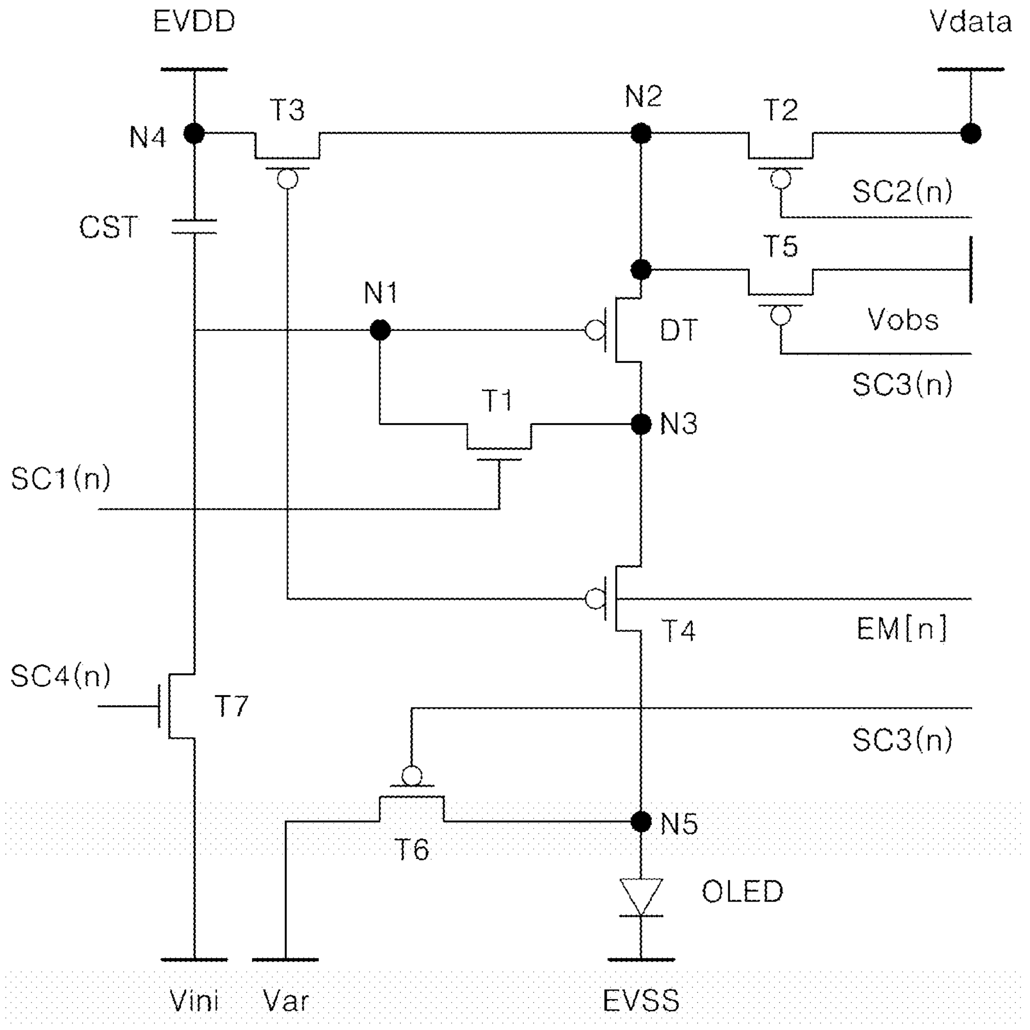
FIG. 4 is a diagram of a pixel circuit in a display device according to an example embodiment of the present disclosure.

FIG. 4 is a diagram of a pixel circuit in a display device according to an example embodiment of the present disclosure.

FIG. 4 only shows an example of a pixel circuit for illustration. A structure of the pixel circuit is not limited particularly as long as the structure thereof may apply a light-emission control signal EM(n) to the pixel to control the light-emission of the light-emitting element EL. For example, the pixel circuit may include a switching thin-film transistor connected to an additional scan signal, and a switching thin-film transistor to which an additional initialization voltage is applied. A connection relationship of the switching element or a connection position of the capacitor may vary. Hereinafter, for convenience of description, a display device with the pixel circuit structure of FIG. 4 is described.

Referring to FIG. 4, each of the plurality of pixels P may include a pixel circuit having the driving transistor DT and the light-emitting element EL connected to the pixel circuit.

The pixel circuit may control the driving current flowing through the light-emitting element EL to drive the light-emitting element EL. The pixel circuit may include the driving transistor DT, the first to seventh transistors T1 to T7, and the capacitor Cst. Each of the transistors DT, and T1 to T7 may include a first electrode, a second electrode, and a gate electrode. One of the first electrode and the second electrode may be a source electrode, and the other of the first electrode and the second electrode may be a drain electrode.

Each of the transistors DT, and T1 to T7 may be a P type thin-film transistor or an N type thin-film transistor. In an embodiment of FIG. 4, the first transistor T1 and the seventh transistor T7 are embodied as N type thin-film transistors, and the remaining transistors DT, and T2 to T6 are embodied as P type thin-film transistors. However, embodiments of the present disclosure are not limited thereto. According to an example embodiment, each of all or some of the transistors DT, and T1 to T7 may be a P type thin-film transistor or an N type thin-film transistor. Furthermore, the N type thin-film transistor may be embodied as an oxide thin-film transistor. The P type thin-film transistor may be embodied as a polycrystalline silicon thin-film transistor.

Hereinafter, an example in which the first transistor T1 and the seventh transistor T7 are embodied as N type thin-film transistors, and the remaining transistors DT, and T2 to T6 are embodied as P type thin-film transistors is described. Accordingly, each of the first transistor T1 and the seventh transistor T7 may be turned on when a high voltage is applied thereto. Each of the remaining transistors DT, and T2 to T6 may be turned on when a low voltage is applied thereto.

According to one example, the first transistor T1 constituting the pixel circuit may function as a compensation transistor, the second transistor T2 may function as a data supply transistor, each of the third and fourth transistors T3 and T4 may function as a light-emission control transistor, the fifth transistor T5 may function as a bias transistor, and each of the sixth and seventh transistors T6 and T7 may function as an initialization transistor.

The light-emitting element OLED may include an anode electrode and a cathode electrode. The anode electrode of the light-emitting element OLED may be connected to a fifth node N5, and the cathode electrode thereof may be connected to the low-potential driving voltage EVSS.

The driving transistor DT may include a first electrode connected to a second node N2, a second electrode connected to a third node N3, and a gate electrode connected to a first node N1. The driving transistor DT may provide a driving current Id to the light-emitting element OLED based on a voltage of the first node N1 or a data voltage stored in the capacitor Cst, which will be described later.

The first transistor T1 may include a first electrode connected to the first node N1, a second electrode connected to the third node N3, and a gate electrode that receives a first scan signal SC1(*n*). The first transistor T1 may be turned on in response to the first scan signal SC1(*n*) such that a diode connection between the first node N1 and the third node N3 is established to sample a threshold voltage Vth of the driving transistor DT. This first transistor T1 may be a compensation transistor.

The capacitor CST may be connected to and disposed between the first node N1 and the fourth node N4. The capacitor CST may store therein or maintain the high potential driving voltage EVDD supplied thereto.

The second transistor T2 may include a first electrode connected to the data line DL or receiving the data voltage Vdata, a second electrode connected to the second node N2, and a gate electrode receiving a second scan signal SC2(*n*). The second transistor T2 may be turned on in response to the second scan signal SC2(*n*) and thus may transmit the data voltage Vdata to the second node N2. This second transistor T2 may be a data supply transistor.

The third transistor T3 and the fourth transistor T4 (or the first and second light-emission control transistors) may be connected to and disposed between the high potential driving voltage EVDD and the light-emitting element OLED, and may establish a current flow path through which the driving current Id generated by the driving transistor DT flows.

The third transistor T3 may include a first electrode connected to the fourth node N4 to receive the high potential driving voltage EVDD, a second electrode connected to the second node N2, and a gate electrode that receives the light-emission control signal EM(n).

The fourth transistor T4 may include a first electrode connected to the third node N3, a second electrode connected to the fifth node N5 (or the anode electrode of the light-emitting element OLED), and a gate electrode that receives the light-emission control signal EM(n).

Each of the third and fourth transistors T3 and T4 may be turned on in response to the light-emission control signal EM(n). In this case, the driving current Id may be provided to the light-emitting element OLED, such that the light-emitting element OLED may emit light at a luminance level corresponding to the driving current Id.

The fifth transistor T5 may include a first electrode receiving the bias voltage Vobs, a second electrode connected to the second node N2, and a gate electrode receiving a third scan signal SC3(*n*). This fifth transistor T5 may be a bias transistor.

The sixth transistor T6 may include a first electrode receiving the first initialization voltage Var, a second electrode connected to the fifth node N5, and a gate electrode receiving the third scan signal SC3(*n*).

The sixth transistor T6 may be turned on in response to the third scan signal SC3(*n*) before the light-emitting element OLED emits light (or after the light-emitting element OLED emits light), such that the anode electrode (or the pixel electrode) of the light-emitting element OLED may be initialized based on the first initialization voltage Var.

The light-emitting element OLED may have a parasitic capacitor generated between the anode electrode and the cathode electrode. Thus, while the light-emitting element OLED emits light, the parasitic capacitor may be charged so that the anode electrode of the light-emitting element OLED may have a specific voltage. Accordingly, an amount of charges accumulated in the light-emitting element OLED may be initialized by applying the first initialization voltage Var to the anode electrode of the light-emitting element OLED via the sixth transistor T6.

In the present disclosure, the fifth and sixth transistors T5 and T6 are configured such that the gate electrodes of the fifth and sixth transistors T5 and T6 commonly receive the third scan signal SC3(*n*). However, embodiments of the present disclosure are not necessarily limited thereto, and the fifth and sixth transistors T5 and T6 may be configured such that the gate electrodes of the fifth and sixth transistors T5 and T6 receive separate scan signals and thus the fifth and sixth transistors T5 and T6 independently operate.

The seventh transistor T7 may include a first electrode receiving the second initialization voltage Vini, a second electrode connected to the first node N1, and a gate electrode receiving a fourth scan signal SC4(*n*).

The seventh transistor T7 may be turned on in response to the fourth scan signal SC4(*n*) such that the gate electrode of the driving transistor DT may be initialized using the second initialization voltage Vini. Unnecessary charges may remain in the gate electrode of the driving transistor DT due to the high-potential driving voltage EVDD stored in the capacitor CST. Accordingly, an amount of the remaining charge may be initialized by applying the second initialization voltage Vini to the gate electrode of the driving transistor DT via the seventh transistor T7.

Figure 5:
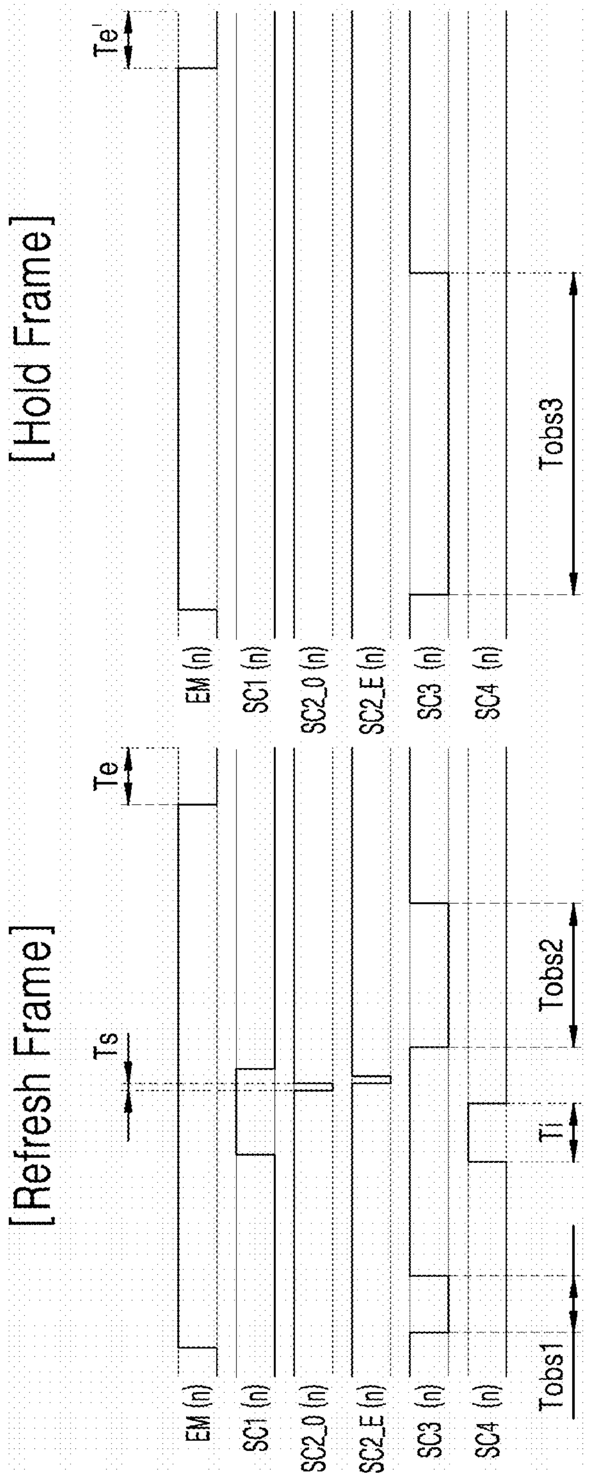
FIG. 5 is a diagram for illustrating application of a scan signal and a light-emission control signal in a refresh period and a hold period in a pixel circuit as shown in FIG. 4.

FIG. 5 is a diagram for illustrating application of a scan signal and a light-emission control signal in a refresh period and a hold period in a pixel circuit as shown in FIG. 4.

A display device according to an example embodiment of the present disclosure may operate as a VRR mode display device. In the VRR mode, the display device operates at a constant frequency, and when a high-speed operation is required, a refresh rate at which the data voltage Vdata is updated increases. Thus, the pixel operates at the increased refresh rate. When low power consumption or a low-speed operation is required, the refresh rate is lowered such that the pixel operates at the lowered refresh rate.

Each of the plurality of pixels P may operate based on a combination of a refresh frame and a hold frame. In other words, when the device operates at high speeds such as 120 Hz or normal speeds such as 60 Hz, only the refresh period may be repeated. However, when the device operates at low speeds such as 1 Hz or 10 Hz, the refresh period and the hold period may be arranged in an alternate manner with each other.

In the refresh frame, a new data voltage Vdata is charged to apply the new data voltage Vdata to the driving transistor DT. In the hold frame, the data voltage Vdata of a previous frame is maintained. In this regard, the hold frame may be referred to as a skip period in the sense that a process of applying the new data voltage Vdata to the driving transistor DT is omitted in the hold frame.

Each of the plurality of pixels P may initialize the charged or remaining voltage within the pixel circuit during the refresh frame. Specifically, each of the plurality of pixels P may remove the influence of the data voltage Vdata and the high potential driving voltage EVDD stored in a previous frame during the refresh frame. Accordingly, each of the plurality of pixels P may display an image corresponding to the new data voltage Vdata in the hold frame.

During the hold frame, each of the plurality of pixels P may provide the driving current corresponding to the data voltage Vdata to the light-emitting element OLED to display an image and may maintain a turned-on state of the light-emitting element OLED.

Referring to FIG. 5, the refresh frame may include at least one bias period Tobs1 and Tobs2, an initialization period Ti, a sampling period Ts, and a light-emission period Te. However, this is only an example, and embodiments of the present disclosure are necessarily limited to this order.

At least one bias period Tobs1 and Tobs2 refers to a period for which an on-bias stress (OBS) operation to which the bias voltage Vobs is applied is performed. In the at least one bias period, the light-emission control signal EM(n) is at a high voltage, and the third and fourth transistors T3 and T4 are turned off. The first scan signal SC1(*n*) and the fourth scan signal SC4(*n*) are at a low voltage, and the first transistor T1 and the seventh transistor T7 are turned off. The second scan signal SC2(*n*) is at a high voltage and the second transistor T2 is turned off.

In the at least one bias period Tobs1 and Tobs2, the third scan signal SC3(*n*) of a low voltage is input, such that the fifth and sixth transistors T5 and T6 are turned on. As the fifth transistor T5 is turned on, the bias voltage Vobs is applied to the first electrode of the driving transistor DT connected to the second node N2.

In this regard, the bias voltage Vobs is supplied to the second node N2 as the source electrode of the driving transistor DT. Thus, in the light-emission period, a charging time or charging delay of the voltage of the fifth node N5 as the anode electrode of the light-emitting element OLED may be reduced. The driving transistor DT is maintained at a stronger saturation state.

In this regard, a magnitude of the drain-source current Id flowing through the driving transistor DT may be reduced, and a stress of the driving transistor DT may be reduced in a positive bias stress situation, thereby resolving the charging delay of the voltage of the third node N3. In other words, a hysteresis of the driving transistor DT may be alleviated by performing an on-bias stress operation thereon before sampling the threshold voltage Vth of the driving transistor DT.

Referring to FIG. 5, the pixel circuit may operate such that the initialization period Ti is included in the refresh frame. The initialization period Ti refers to a period for which the voltage of the gate electrode of the driving transistor DT is initialized.

In the initialization period Ti, each of the first scan signal SC1(*n*) to the fourth scan signal SC4(*n*), and the light-emission control signal EM(n) is at a high voltage and the first transistor T1 and the seventh transistor T7 are turned on. The second to sixth transistors T2, T3, T4, T5, and T6 are turned-off. As the first and seventh transistors T1 and T7 are turned on, the gate electrode and the second electrode of the driving transistor DT connected to the first node N1 are initialized with the second initialization voltage Vini.

Referring to FIG. 5, the pixel circuit may operate such that the sampling period Ts is included in the refresh frame. The sampling period refers to a period for which the threshold voltage Vth of the driving transistor DT is sampled.

In the sampling period Ts, each of the first scan signal SC1(*n*), the third scan signal SC3(*n*), and the light-emission control signal EM(n) is at a high voltage, and the second scan signal SC2_O(n) to SC2_E(n) and the fourth scan signal SC4(*n*) of a low voltage are input. Accordingly, the third to seventh transistors T3, T4, T5, T6, and T7 are turned off, the first transistor T1 is maintained in the turned on state, and the second transistor T2 is turned on. That is, the second transistor T2 is turned on, such that the data voltage Vdata is applied to the driving transistor DT, and thus, the diode connection between the first node N1 and the third node N3 is established, such that the threshold voltage Vth of the driving transistor DT may be sampled.

Referring to FIG. 5, the pixel circuit may operate such that the light-emission period Te is included in the refresh frame. The light-emission period Te refers to a period for which the sampled threshold voltage Vth of the driving transistor DT is cancelled out and the light-emitting element OLED emits light under the driving current corresponding to the sampled data voltage Vdata.

In the light-emission period Te, the light-emission control signal EM(n) is at a low voltage, and the third and fourth transistors T3 and T4 are turned on.

As the third transistor T3 is turned on, the high potential driving voltage EVDD connected to the fourth node N4 may be applied to the first electrode of the driving transistor DT connected to the second node N2 via the third transistor T3. The driving current Id supplied from the driving transistor DT to the light-emitting element OLED via the fourth transistor T4 may depend on the data voltage Vdata value regardless of the value of the threshold voltage Vth of the driving transistor DT. Thus, the threshold voltage Vth of the driving transistor DT is compensated for.

Referring to FIG. 5, the operation of the pixel circuit and the light-emitting element in the hold frame are described.

The hold frame may include at least one bias period Tobs3 and a light-emission period Te'. The description of the same operation of the pixel circuit in the hold frame as the operation thereof in the refresh frame will be omitted.

As described above, in the refresh frame, the new data voltage Vdata is charged to apply the new data voltage Vdata to the gate electrode of the driving transistor DT. However, in the hold frame, the data voltage Vdata of the refresh frame is maintained. Therefore, unlike the refresh frame, the hold frame does not require the initialization period Ti and the sampling period Ts.

Referring to FIG. 5, a difference between the driving signal in the above-described refresh frame and the driving signal in the hold frame is about the second and fourth scan signals SC2(*n*) and SC4(*n*). In the hold frame, the initialization period Ti and the sampling period Ts are unnecessary. Thus, unlike the refresh frame, in the hold frame, the second scan signal SC2_O(n) to SC2_E(n) is always at a high voltage, and the fourth scan signal SC4(*n*) is always at a low voltage. That is, the second and seventh transistors T2 and T7 are always turned off.

Figure 6:
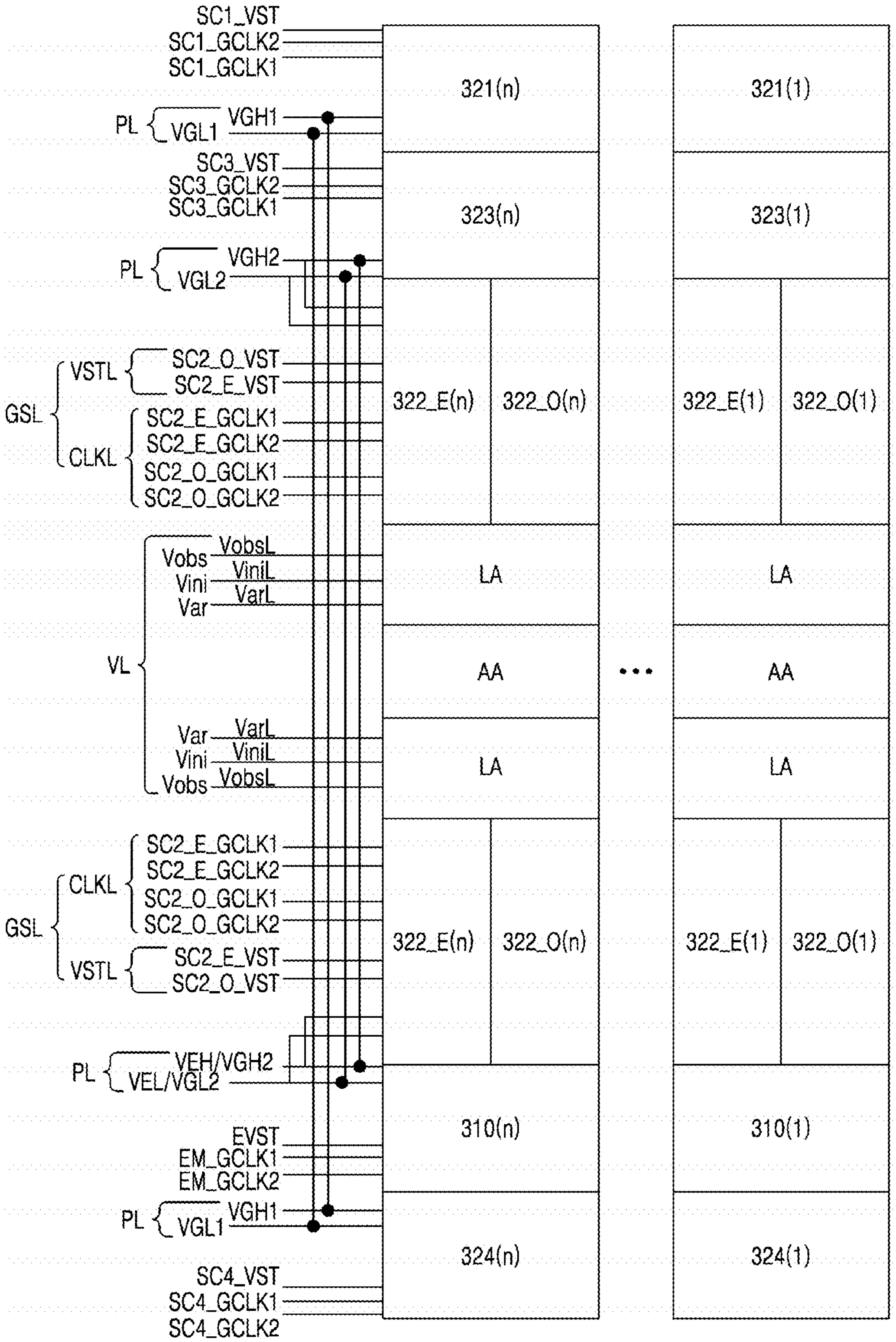
FIG. 6 is a diagram of a configuration of a gate driver in a display device according to an example embodiment of the present disclosure.

FIG. 6 is a diagram of a configuration of a gate driver in a display device according to an example embodiment.

Referring to FIG. 6, the gate driver 300 includes a light-emission control driver 310 and a scan driver 320. The scan driver 320 may include a first scan driver to a fourth scan driver 321, 322, 323, and 324. Further, the second scan driver 322 may be composed of an odd-numbered second scan driver 322_O and an even-numbered second scan driver 322_E. In other words, each of stages STG(1) to STG(n) of the shift register may include each of first scan signal generators 321(1) to 321(*n*), each of second scan signal generators 322_O(1) to 322_O(n) and 322_E(1) to 322_E(n), each of third scan signal generators 323(1) to 323(*n*), each of fourth scan signal generators 324(1) to 324(*n*) and each of light-emission control signal generators 310(1) to 310(*n*).

The gate driver 300 may include shift registers which may be respectively disposed on both opposing sides of the display area AA symmetrically. The second scan driver 322_O and 322_E, the fourth scan driver 324, and the light-emission control driver 310 may be disposed in one side area around the display area AA. The first scan driver 321, the second scan driver 322_O and 322_E, and the third scan driver 323 may be disposed in the other side area around the display area AA. However, embodiments of the present disclosure are not limited thereto, and depending on an embodiment, at least one of the second scan driver 322_O and 322_E, the fourth scan driver 324, and the light-emission control driver 310 may be disposed in the other side area around the display area AA, while at least one of the first scan driver 321, the second scan driver 322_O and 322_E, and the third scan driver 323 may be disposed in one side area around the display area AA.

In one side area around the display area AA, the second scan drivers 322_O and 322_E may be disposed adjacent to the display area AA, and the fourth scan driver 324 may be disposed in the outermost area, and the light-emission control driver 310 may be disposed between the second scan driver 322_O and 322_E and the fourth scan driver 324.

Alternatively, depending on an embodiment, the light-emission control driver 310 may be disposed in the outermost area.

Furthermore, in the other side area around the display area AA, the second scan driver 322_O and 322_E may be disposed adjacent to the display area AA, and the first scan driver 321 may be disposed in the outermost area, and the third scan driver 323 may be disposed between the second scan driver 322_O and 322_E and the first scan driver 321.

Alternatively, depending on an embodiment, the third scan driver 323 may be disposed in the outermost area.

Furthermore, the second scan driver 322_O and 322_E may be divided into the odd-numbered scan driver 322_O and the even-numbered scan driver 322_E. The odd-numbered scan drivers 322_O may be respectively disposed on both opposing sides of the display area AA. The even-numbered scan drivers 322_E may be respectively disposed on both opposing sides of the display area AA. When the second scan driver operates such that the odd-numbered scan driver 322_O and the even-numbered scan driver 322_E operate separately, a sufficient time required for sampling the data voltage Vdata may be secured. Furthermore, the odd-numbered scan drivers 322_O are respectively disposed on both opposing sides of the display area AA, while the even-numbered scan drivers 322_E are respectively disposed on both opposing sides of the display area AA, thereby reducing a difference between sampling times of the data voltage Vdata in the pixels. Accordingly, as the second scan drivers 322_O and 322_E operate, the sufficient time for sampling may be secured and the difference between the sampling times thereof in the pixels may be reduced when sampling the data voltage Vdata, thereby improving the image quality of the display panel.

Each of the light-emission control driver 310 and the first to fourth scan drivers 321 to 324 operates in response to reception of each of the start signals and the clock signals applied thereto via each of the plurality of start signal lines VSTL and the plurality of clock signal lines CLKL.

In this regard, the clock signals may have different phases, the plurality of clock signals may be applied via a plurality of different clock signal lines, respectively, and the clock signals applied to the same gate driver may be applied via adjacent clock signal lines CLKL, respectively. In other words, in response to reception of one start signal and one clock signal, each of the light-emission control driver 310 and the first to fourth scan drivers 321 to 324 may output the gate signal to the pixel circuit. The clock signal includes a first clock signal and a second clock signal. The first clock signal and the second clock signal are applied thereto via adjacent clock signal lines CLKL, respectively, and the adjacent clock signals lines CLKL may constitute a pair. The controller 200 may control the display panel to separately operate in a refresh period or a hold period based on a refresh rate. The hold period may have a portion for which each of the first start signal and the second start signal is output at a fixed voltage level. Each of the first clock signal and the second clock signal may continuously toggle in each of the refresh period and the hold period. The first clock signal, the second clock signal, the first start signal, and the second start signal may be applied via a data driver 400. The first start signal and the second start signal may be applied via different signal lines, respectively.

Referring to FIG. 6, the power line VL such as the bias voltage bus line VobsL, the first initialization voltage bus line VarL, and the second initialization voltage bus line ViniL, may be disposed in a link area LA between the gate driver 300 and the display area AA. The power lines VL may be disposed adjacent to the display area in a following order: bias voltage bus line VobsL, second initialization voltage bus line ViniL, and first initialization voltage bus line VarL. However, the arrangement order is not limited thereto and may vary depending on a design.

The power line VL may supply the bias voltage Vobs, the first initialization voltage Var and the second initialization voltage Vini as a direct current voltage DC from the power supply 500 to the pixel circuit via power link lines respectively branched from the bias voltage bus line VobsL, the first initialization voltage bus line VarL and the second initialization voltage bus line ViniL, respectively.

In the drawing, it is shown that the power lines VL are arranged in a symmetrical manner on both opposing sides of the display area AA. However, embodiments of the present disclosure are not limited thereto and the power lines VL may be located only on the left or right side of the display area AA. Alternatively, the power lines may be located only on an upper or lower side of the display area AA.

The power line VL and the source electrode or the drain electrode 140 may be made of the same material and may be disposed in the same layer. The power line VL and the connection electrode 155 may be made of the same material and may be disposed in the same layer.

At least a portion of the power link line and the gate electrode 125 and 126 may be made of the same material and may be disposed in the same layer. Alternatively, at least a portion of the power link line and the touch electrode layer 194, 195 and 196 may be made of the same material and may be disposed in the same layer. Alternatively, at least a portion of the power link line and the semiconductor layer 115 and 116 may be made of the same material and may be disposed in the same layer. Furthermore, at least a portion of the power link line and a shield metal layer which is not shown in the drawing may be made of the same material and may be disposed in the same layer.

Figure 7A:
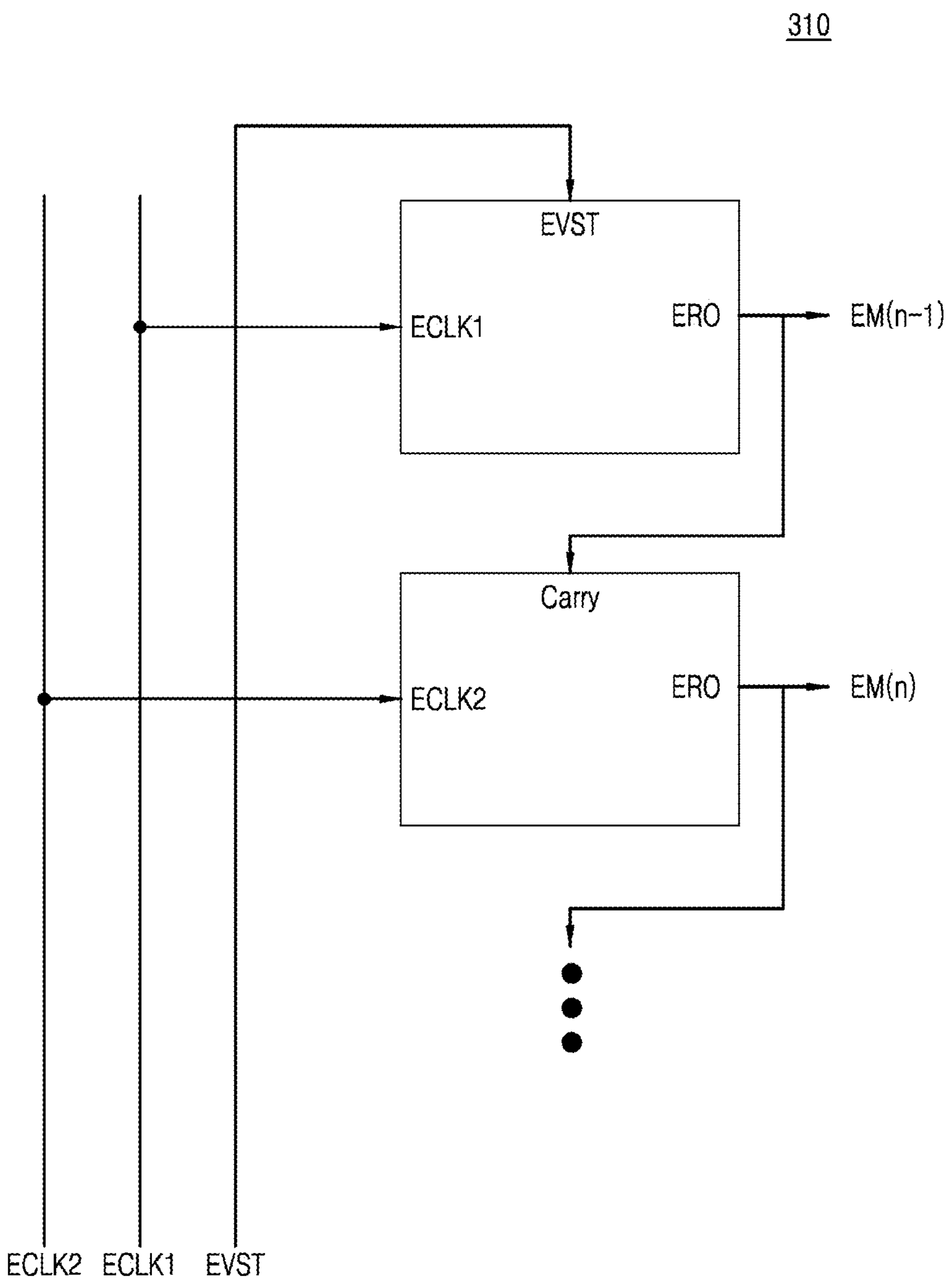
FIG. 7A is a diagram showing a configuration of a shift register of a gate driver according to an example embodiment of the present disclosure.
Figure 7B:
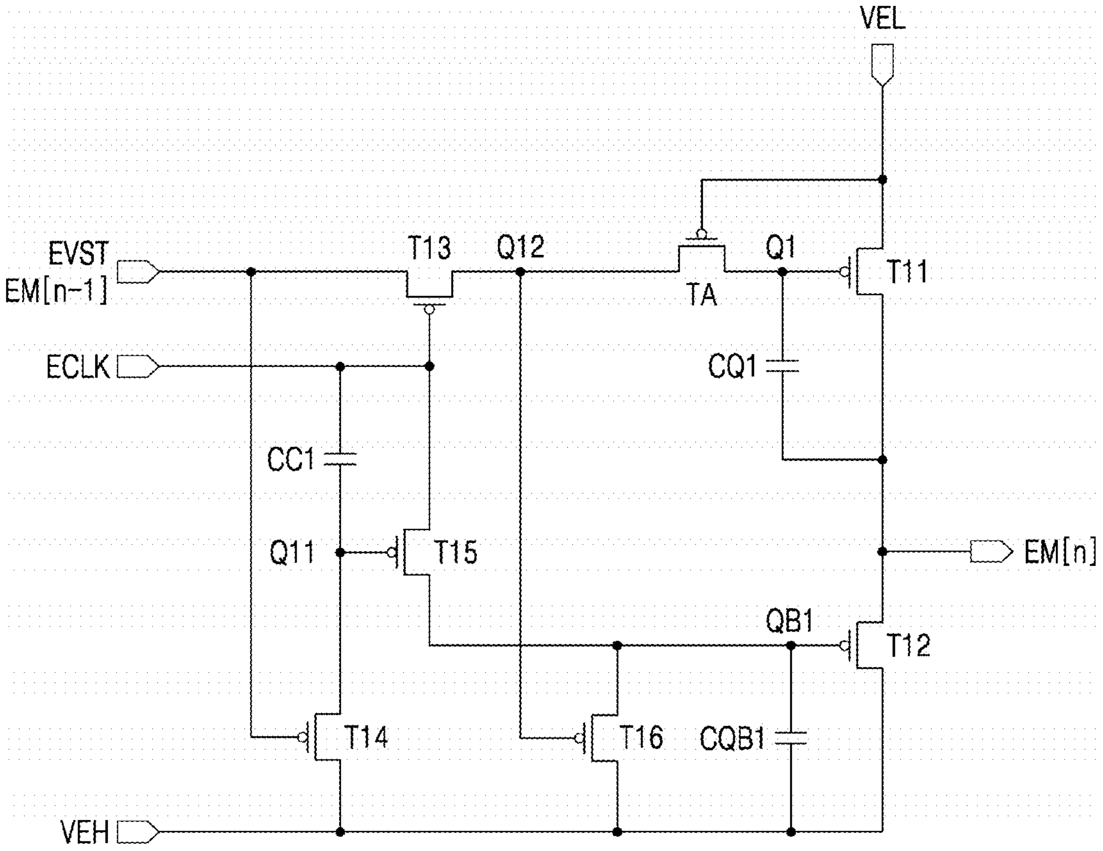
FIG. 7B is an example of a driver circuit of the shift register in FIG. 7A.

FIG. 7A is a diagram showing a configuration of a shift register of the gate driver according to an example embodiment of the present disclosure, and FIG. 7B is an example of a driver circuit of the shift register in FIG. 7A.

Referring to FIG. 7A, the light-emission control signal generators 310(1) to **310(*n*) of the light-emission control driver 310 may receive a light-emission control start signal EVST, a first light-emission control clock signal ECLK1, and a second light-emission control clock signal ECLK2 and may output light-emission control signals EM(1) to EM(n) via a plurality of light-emission control lines EML. The light-emission control driver 310** may apply the same signal to an odd-numbered pixel row and an even-numbered pixel row.

The first scan signal generators 321(1) to 321(*n*) of the first scan driver 321 may receive a first start signal SC1_VST, a (1-1)-st clock signal SC1_GCLK1, and a (1-2)-nd clock signal SC1_GCLK2 and may output a plurality of first scan signals SC1(1) to SC1(*n*) via a plurality of first scan lines SCL1.

The fourth scan signal generators 324(1) to 324(*n*) of the fourth scan driver 324 may receive a fourth start signal SC4_VST, a (4-1)-st clock signal SC4_GCLK1, and a (4-2)-nd clock signal SC4_GCLK2 and may output a plurality of fourth scan signals SC4(1) to SC4(*n*) via a plurality of fourth scan lines SCL4.

A shift register structure of each of the first scan driver 321 and the fourth scan driver 324 may be the same as the shift register structure of the light-emission control driver 310.

The clock signal lines CLKL corresponding to the light-emission control signal generators 310(1) to 310(*n*) may be alternately connected to the odd-numbered stages and the even-numbered stages so that each of the light-emission control signal generators 310(1) to 310(*n*) may receive only one clock signal. That is, as shown in FIG. 7A, the first light-emission control clock signal ECLK1 may be applied to the odd-numbered stage, and the second light-emission control clock signal ECLK2 may be applied to the even-numbered stage.

As in the light-emission control driver 310, the clock signal lines CLKL corresponding to the scan signal generators of each of the first scan driver 321, the third scan driver 323, and the fourth scan driver 324 may be alternately connected to the odd-numbered stages and the even-numbered stages such that each of the scan signal generators of each of the first scan driver 321, the third scan driver 323, and the fourth scan driver 324 receive only one clock signal.

The gate signal output from each of the signal generators of each of the light-emission control driver 310, the first scan driver 321, the third scan driver 323, and the fourth scan driver 324 may be affected by the start signal rather than the clock signal. Thus, only one clock signal may be applied thereto.

Furthermore, the light-emission control driver 310, the first scan driver 321, the third scan driver 323, and the fourth scan driver 324 may be disposed on the left or right side of the display area AA and may supply respective gate signals to the plurality of pixels P connected thereto via respective gate lines GL. This scheme may be a single feeding scheme. However, embodiments of the present disclosure are not limited thereto. The light-emission control drivers 310, the first scan drivers 321, the third scan drivers 323, and the fourth scan drivers 324 may be arranged in a symmetrical structure on both opposing sides of the display area AA and may supply the same signal to respective gate lines GL. This scheme may be a double feeding scheme.

Furthermore, the same gate signal output from each of the light-emission control driver 310, the first scan driver 321, the third scan driver 323, and the fourth scan driver 324 may be applied to two pixel rows arranged in the display area AA. This structure may be a two-row sharing structure.

Furthermore, it is shown that the clock signal line CLKL for applying the first light-emission control clock signal ECLK1 and the second light-emission control clock signal ECLK2 is disposed outwardly of the start signal line VSTL for applying the light-emission control start signal EVST. However, embodiments of the present disclosure are not limited thereto.

In FIG. 7A, ERO represents an output terminal through which an emission signal is output, and Carry represents an enable terminal through which the emission signal of the previous stage is input as an enable signal of the next stage.

FIG. 7B illustrates a driver circuit of the light-emission control driver 310. The configuration thereof may be applied to the driver circuit of each of the first scan driver 321, the third scan driver 323, and the fourth scan driver 324.

Referring to FIG. 7B, the driver circuit of the light-emission control driver 310 may include a (1-1)-st gate transistor T11, a (1-2)-nd gate transistor T12, a (1-3)-rd gate transistor T13, a (1-4)-th gate transistor T14, a (1-5)-th gate transistor T15, a (1-6)-th gate transistor T16, a first transfer transistor TA, a first capacitor CQ1, a second capacitor CQB1, and a third capacitor CC1.

The (1-1)-st gate transistor T11 may pull up an output in response to a signal of a Q1 node, and the (1-2)-nd gate transistor T12 may pull down an output in response to a signal of a QB1 node. The (1-3)-rd gate transistor T13 provides the start signal EVST or an output signal EM[n−1] of a previous stage to a Q12 node in response to the clock signal ECLK. The (1-4)-th gate transistor T14 transmits a high potential voltage VEH to a Q11 node in response to the start signal EVST or the output signal EM[n−1] of the previous stage. The (1-5)-th gate transistor T15 provides the clock signal ECLK to a QB1 node in response to a voltage of the Q11 node. The (1-6)-th gate transistor T16 transmits the high potential voltage VEH to the QB1 node in response to a voltage of the Q12 node.

The first transfer transistor TA transfers the charges of the Q12 node to the Q1 node in response to a low potential voltage VEL. The first transfer transistor TA may be connected to and disposed between the Q12 node and the Q1 node and serves as a buffer to prevent sudden change in the voltage applied to the Q1 node. The first transfer transistor TA continuously electrically connects the Q1 node and the Q12 node to each other. Therefore, the voltage of the Q12 node may be maintained to be equal to the voltage of the Q1 node.

The first capacitor CQ1 may be coupled to and disposed between the Q1 node and the output terminal. The second capacitor CQB1 may be coupled to and disposed between the QB1 node and the high potential voltage VEH. The third capacitor CC1 may be coupled to and disposed between the clock signal ECLK and a drain electrode of a transistor T14 and be coupled to and disposed between the clock signal ECLK and a gate electrode of a transistor T15.

The first capacitor CQ1 and the second capacitor CQB1 may operate as a bootstrap capacitor, and the third capacitor CC1 may operate as a stabilization capacitor.

Furthermore, the third capacitor CC1 may be designed to have a larger capacity than that of the first capacitor CQ1 or the second capacitor CQB1. In other words, the third capacitor CC1 may occupy a larger area than an area occupied with the first capacitor CQ1 or the second capacitor CQB1.

Figure 8A:
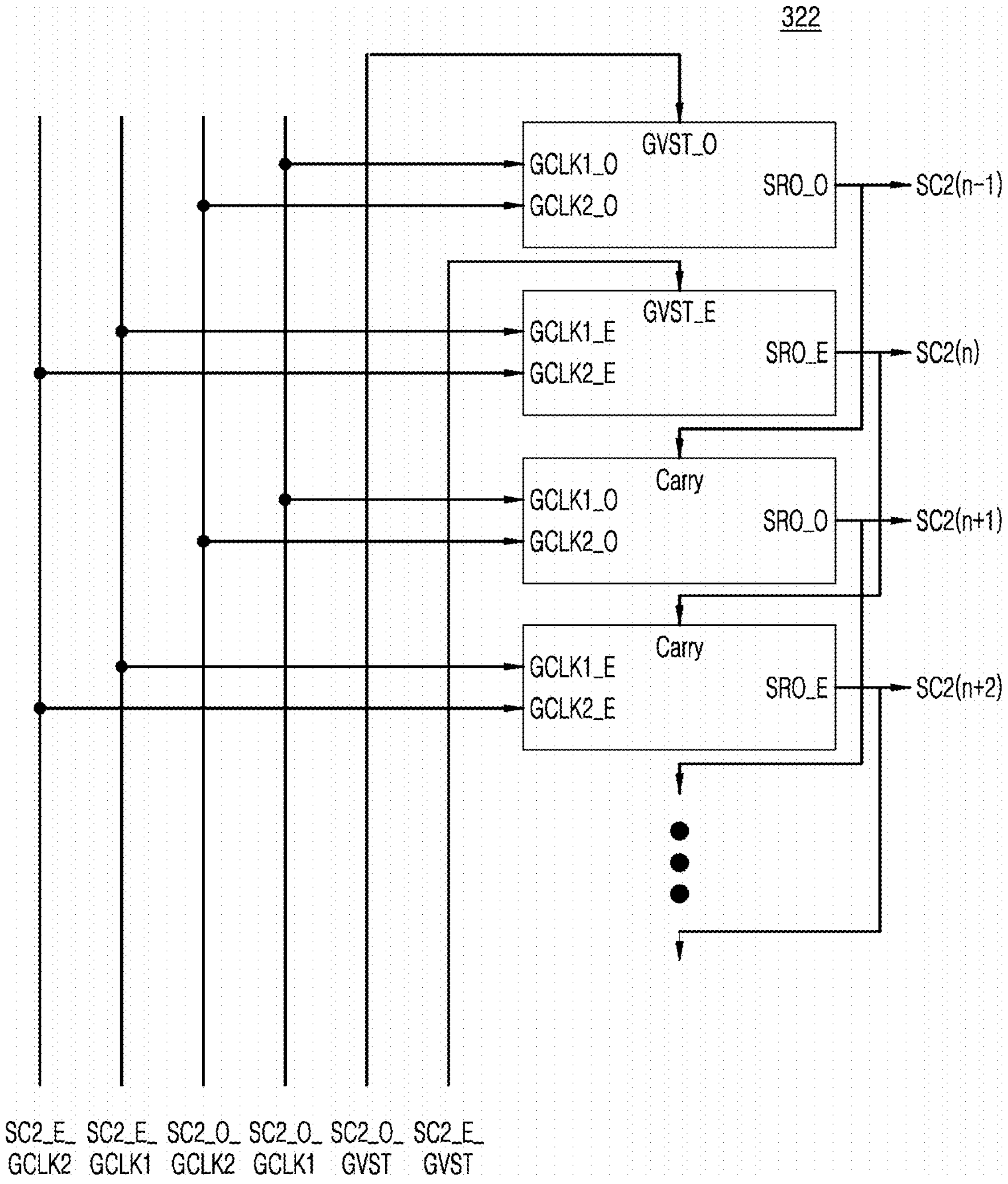
FIG. 8A is a diagram showing a configuration of a shift register of another gate driver according to an example embodiment of the present disclosure.
Figure 8B:
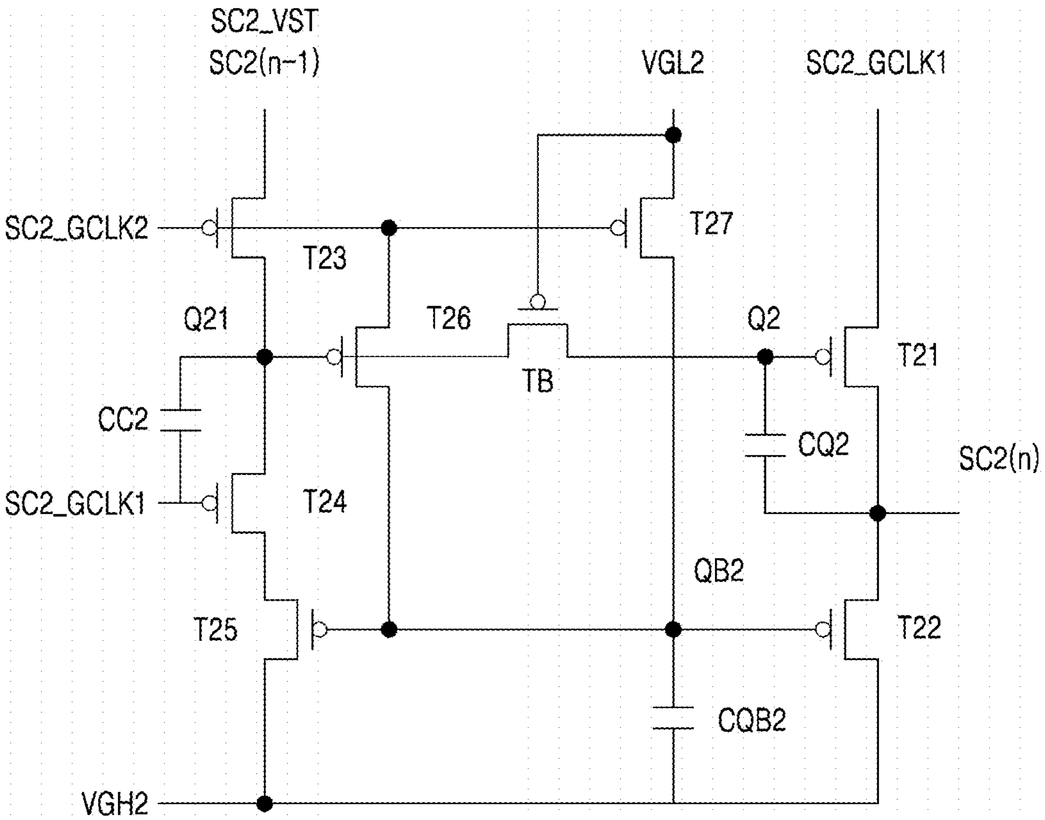
FIG. 8B is an example of a driver circuit of the shift register in FIG. 8A.

FIG. 8A is a diagram showing a configuration of a shift register of another gate driver according to an example embodiment of the present disclosure, and FIG. 8B is an example of a driver circuit of the shift register in FIG. 8A.

Referring to FIG. 8A, the second scan signal generators 322(1) to 322(*n*) of the second scan driver 322 may receive a second start signal SC2_GVST, a (2-1)-th clock signal SC2_GCLK1, and a (2-2)-th clock signal SC2_GCLK2 and may output a plurality of second scan signals SC2(*n*−1) to SC2(*n*+2) via a plurality of second scan lines SCL2.

The clock signal lines CLKL corresponding to the second scan signal generators 322(1) to 322(*n*) may be respectively connected to the stages so that each of the second scan signal generators 322(1) to 322(*n*) receive two clock signals. That is, as shown in FIG. 8A, the second scan signal generator 322(*n*) may be composed of the odd-numbered second scan driver 322_O and the even-numbered second scan driver 322_E. An odd-numbered (2-1)-th clock signal SC2_O_GCLK1 and an odd-numbered (2-2)-th clock signal SC2_O_GCLK2 may be applied to the odd-numbered second scan driver 322_O disposed in the odd-numbered stage. An even-numbered (2-1)-th clock signal SC2_E_GCLK1 and an even-numbered (2-2)-th clock signal SC2_E_GCLK2 may be applied to each even-numbered second scan driver 322_E disposed in the even-numbered stage. In other words, the plurality of clock signal lines CLKL may be alternately connected to the odd-numbered stages and the even-numbered stages.

The gate signal output from each of the scan signal generators of the second scan driver 322 may be affected by the clock signal rather than the start signal. Thus, at least two clock signals may be applied thereto.

Furthermore, the second scan drivers 322 may be arranged symmetrically on both opposing sides of the display area AA, respectively, and may supply the same signal to one gate line GL. This scheme may be a double feeding scheme. However, embodiments of the present disclosure are not limited thereto. The second scan driver 322 may be disposed on the left or right side of the display area AA and may supply the gate signal to the plurality of pixels P connected thereto via one gate line GL. This scheme may be a single feeding scheme.

Furthermore, the same gate signal output from the second scan driver 322 may be supplied to one pixel row arranged in the display area AA. The second scan driver 322 may be respectively disposed on both opposing sides of the display panel and apply the same signal to the same pixel row. This configuration may be a single-row sharing structure.

Furthermore, it is shown that the clock signal line CLKL which applies the even-numbered (2-1)-st clock signal SC2_E_GCLK1 and the even-numbered (2-2)-nd clock signal SC2_E_GCLK2 is disposed outwardly of the clock signal line CLKL which applies the odd-numbered (2-1)-st clock signal SC2_O_GCLK1 and the odd-numbered (2-2)-nd clock signal SC2_O_GCLK2. However, embodiments of the present disclosure are not limited thereto.

Hereinafter, for convenience of description, the odd-numbered second scan driver 322_O and the even-numbered second scan driver 322_E are not distinguished from each other but are collectively referred to one second scan driver 322. The clock signals input to the odd-numbered second scan driver 322_O and the even-numbered second scan driver 322_E respectively are not distinguished from each other but are collectively referred to one clock signal. The start signals input to the odd-numbered second scan driver 322_O and the even-numbered second scan driver 322_E respectively are not distinguished from each other but are collectively referred to one start signal.

In FIG. 8A, SRO_O and SRO_E represent output terminals through which the second scan signal SC2 is output, and Carry represents an enable terminal through which the second scan signal SC2 of the previous stage is input as an enable signal of the next stage.

Referring to FIG. 8B, the driver circuit of the second scan driver 322 may include a plurality of gate transistors T21, T22, T23, T24, T25, T26, T27, and TB and at least one capacitor CQ2, CQB2, and CC2.

The driver circuit of the second scan driver 322 may include a fourth capacitor CQ2 electrically connected to and disposed between a Q2 node and an output terminal of the gate signal, and a fifth capacitor CQB2 electrically connected to and disposed between a QB2 node and an input terminal of a second gate driving voltage VGH2.

The fourth capacitor CQ2 and the fifth capacitor CQB2 may operate as bootstrap capacitors.

Furthermore, the driver circuit of the second scan driver 322 may include a sixth capacitor CC2 electrically connected to and disposed between a Q21 node and an input terminal of the (2-1)-st clock signal SC2_GCLK1.

The capacity of the sixth capacitor CC2 may be set to a capacity at which the sixth capacitor may stably control a voltage level of the Q21 node. Thus, the sixth capacitor may operate as a stabilization capacitor.

The capacity of the sixth capacitor CC2 may be the same as or different from the capacity of the fourth capacitor CQ2 or the fifth capacitor CQB2. In other words, the sixth capacitor CC2 may be designed to have a larger capacity than that of the fourth capacitor CQ2 or the fifth capacitor CQB2 and may occupy a larger area than an area occupied with the fourth capacitor CQ2 or the fifth capacitor CQB2.

The input terminal of the (2-1)-st clock signal SC2_GCLK1 may refer to the input terminal of the (2-1)-st clock signal SC2_GCLK1 that is electrically connected to the gate node of the (2-4)-th gate transistor T24. Alternatively, the input terminal of the (2-1)-st clock signal SC2_GCLK1 may mean the input terminal of the (2-1)-st clock signal SC2_GCLK1 electrically connected to the (2-1)-st gate transistor T21.

A line supplying the (2-1)-st clock signal SC2_GCLK1 to the (2-4)-th gate transistor T24 and a line supplying the (2-1)-st clock signal SC2_GCLK1 to the (2-6)-th gate transistor T26 may be the same or different as or from each other.

A capacitance may be generated between a Q21 node and the input terminal of the (2-1)-st clock signal SC2_GCLK1 due to the sixth capacitor CC2. A voltage level of the Q21 node may vary depending on a voltage level of the (2-1)-st clock signal SC2_GCLK1.

Accordingly, since a low-level (2-1)-st clock signal SC2_GCLK1 is supplied at a timing of outputting a low-level scan signal, the voltage level of the Q21 node may be maintained at the low level.

Furthermore, since the low level of the Q21 node is maintained by the sixth capacitor CC2, a turned-on state of the (2-5)-th gate transistor T25 may be maintained.

Since the turned-on state of the (2-5)-th gate transistor T25 is maintained, a high level (2-2)-nd clock signal SC2_GCLK2 may be normally supplied to the QB2 node.

Since the high level voltage is normally charged to the QB2 node, the (2-3)-rd gate transistor T23 and the (2-7)-th gate transistor T27 may maintain a turned-off state.

Therefore, the voltage level of each of the Q21 node and the Q2 node may be stably maintained, and a low-level gate signal may be normally output through the output terminal.

Figure 9:
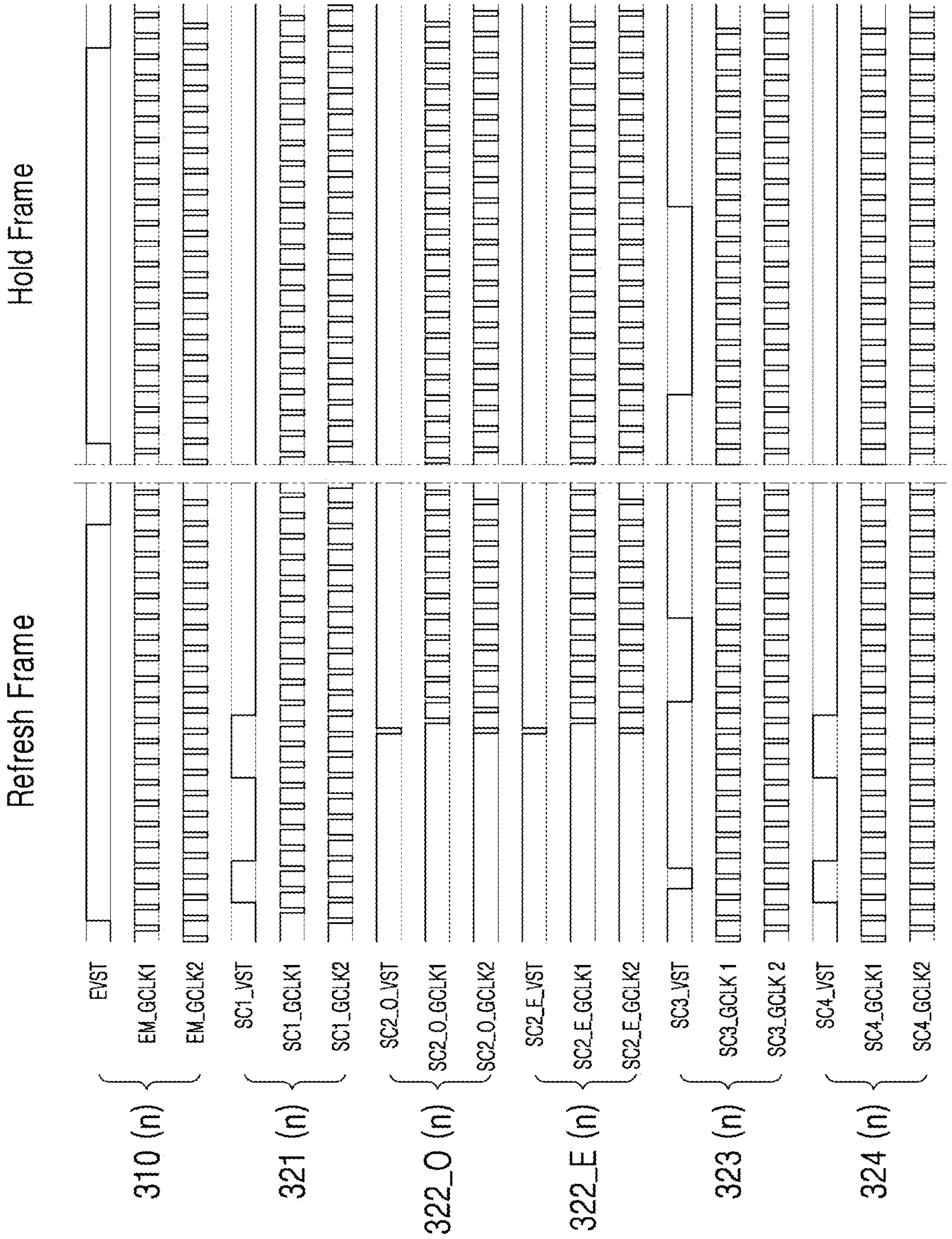
FIG. 9 is a signal waveform diagram of a start signal and a clock signal applied to the gate driver in FIG. 7 to FIG. 8.

FIG. 9 is a signal waveform diagram of the start signal and the clock signal applied to the gate driver in FIG. 7 to FIG. 8.

Referring to FIG. 9, each of the light-emission control driver 310 and the first to fourth scan drivers 321 to 324 may separately operate in a refresh period and a hold period depending on an operation frequency. The start signals and the clock signals respectively applied via the plurality of start signal lines VSTL and the plurality of clock signal lines CLKL may be applied depending on the operation frequency.

In other words, during the refresh period, the start signal and the clock signal may be applied such that the pixel circuit separately operates in the at least one bias period Tobs1 and Tobs2, the initialization period Ti, the sampling period Ts, and the light-emission period Te. During the hold period, the pixel circuit does not require the initialization period Ti and the sampling period Ts. Thus, during the hold period, only some start signals at a turn-on level may be applied only in the bias period Tobs3, or may be applied only in the light-emission period Te'. The remaining start signals may be applied at a fixed voltage level. At this time, all clock signals applied to each of the light-emission control driver 310 and the plurality of scan driver 320 may continue to toggle during the hold period.

In high-temperature or high-humidity environments, OH-charges may be produced in the display panel 100 and the IC package 401 due to moisture infiltration. However, all clock signals may toggle, such that charge migration between adjacent bumps of the IC package 401 may be reduced. Furthermore, film lift-off between the insulating layers due to the charge migration may be reduced.

Each of the start signal and the clock signal applied to the gate driver 300 may be controlled in this way, such that in the low-speed operation, the display device may operate stably even in high temperature or high humidity environments.

A display device according to various aspects and features of the present disclosure may be described as follows.

One aspect of the present disclosure provides a display device comprising: a display panel including a display area in which a plurality of pixels are disposed, and a non-display area disposed around the display area; a light-emission control driver configured to receive a first start signal and a first clock signal and to supply a light-emission control signal to the display panel; at least one scan driver configured to receive a second start signal and a second clock signal and to supply a scan signal to the display panel; and a controller configured to control the display panel to separately operate in a refresh period or a hold period based on a refresh rate, wherein the hold period has a portion for which each of the first start signal and the second start signal is for being output at a fixed voltage level, wherein each of the first clock signal and the second clock signal is to continuously toggle in each of the refresh period and the hold period.

According to some features of the display device, the first clock signal, the second clock signal, the first start signal, and the second start signal are for being applied via a data driver.

According to some features of the display device, the data driver includes a plurality of bumps, and the plurality of bumps include input bumps and output bumps.

According to some features of the display device, the input bumps are arranged in one row, and the output bumps are arranged in three rows.

According to some features of the display device, each of the plurality of bumps overlaps a gate electrode, a first source/drain electrode, a second source/drain electrode, and a touch electrode in a bump area.

According to some features of the display device, in the bump area, the second source/drain electrode has a width greater than a width of the first source/drain electrode.

According to some features of the display device, in the bump area, the second source/drain electrode covers the first source/drain electrode.

According to some features of the display device, in the bump area, a planarization layer is formed to cover at least a portion of the second source/drain electrode.

According to some features of the display device, in the bump area, an insulating layer is absent between the first source/drain electrode and the second source/drain electrode.

According to some features of the display device, the first clock signals or the second clock signals are for being applied via bumps adjacent to each other, respectively.

According to some features of the display device, the first clock signal is for being applied via a first clock signal line, and the second clock signal is for being applied via a second clock signal line.

According to some features of the display device, at least some of the plurality of bumps are for being electrically connected to each other.

According to some features of the display device, the first start signal and the second start signal are for being applied via different signal lines, respectively.

According to some features of the display device, the first clock signal or the second clock signal includes a plurality of clock signals having different phases.

According to some features of the display device, the plurality of clock signals are for being applied via a plurality of different clock signal lines, respectively.

According to some features of the display device, at least some of the plurality of different clock signal lines are adjacent to each other to constitute a pair.

According to some features of the display device, the scan driver includes a plurality of scan drivers configured to output a plurality of different scan signals, respectively.

According to some features of the display device, the scan driver includes a first scan driver, a second scan driver, a third scan driver, and a fourth scan driver.

According to some features of the display device, the second scan driver includes second scan drivers, and the second scan drivers are respectively disposed on both opposing sides of the display panel and are configured to apply a same signal to a same pixel row.

According to some features of the display device, the light-emission control driver is configured to apply a same signal to an odd-numbered pixel row and an even-numbered pixel row.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects. The scope of protection of the present disclosure should be construed based on the following claims, and all technical features within the scope of equivalents thereof should be construed as being included within the scope of the present disclosure.

What is claimed is:

1. A display device, comprising:

a display panel including a display area in which a plurality of pixels are disposed, and a non-display area disposed around the display area;

a light-emission control driver configured to receive a first start signal and a first clock signal and to supply a light-emission control signal to the display panel;

at least one scan driver configured to receive a second start signal and a second clock signal and to supply a scan signal to the display panel; and a controller configured to control the display panel to separately operate in a refresh period or a hold period based on a refresh rate, wherein the at least one scan driver includes a scan driver configured to drive a transistor that supplies a data voltage to each of the plurality of pixels, wherein the hold period includes a portion for which each of the first start signal and the second start signal is maintained at a fixed voltage level, wherein the first clock signal continuously toggles in each of the refresh period and the hold period, wherein, during the refresh period, the second clock signal applied to the scan driver is initially maintained at a first voltage level and then periodically toggles between the first voltage level and a second voltage level after the second start signal transitions from the first voltage level to the second voltage level, and wherein, during the hold period, the second start signal is fixed at the first voltage level, and the second clock signal periodically toggles between the first voltage level and the second voltage level.

2. The display device of claim 1, wherein the first clock signal, the second clock signal, the first start signal, and the second start signal are for being applied via a data driver.

3. The display device of claim 2, wherein the data driver includes a plurality of bumps, and the plurality of bumps include input bumps and output bumps.

4. The display device of claim 3, wherein the input bumps are arranged in one row, and the output bumps are arranged in three rows.

5. The display device of claim 3, wherein each of the plurality of bumps overlaps a gate electrode, a first source/drain electrode and a second source/drain electrode of a transistor, and a touch electrode that are in a bump area and that are in a pixel circuit of a pixel of the plurality of pixels.

6. The display device of claim 5, wherein in the bump area, the second source/drain electrode has a width greater than a width of the first source/drain electrode.

7. The display device of claim 5, wherein in the bump area, the second source/drain electrode covers the first source/drain electrode.

8. The display device of claim 5, wherein in the bump area, a planarization layer is formed to cover at least a portion of the second source/drain electrode.

9. The display device of claim 5, wherein in the bump area, an insulating layer is absent between the first source/drain electrode and the second source/drain electrode.

10. The display device of claim 5, further comprising a power line for supplying a bias voltage and an initialization voltage to the pixel circuit, wherein the power line and the first source/drain electrode are disposed in a same layer with a same material.

11. The display device of claim 10, wherein the power line is configured to supply the bias voltage and the initialization voltage though a power link line, and wherein at least a portion of the power link line and the gate electrode or the touch electrode are disposed in a same layer with a same material.

12. The display device of claim 3, wherein the first clock signals or the second clock signals are for being applied via bumps adjacent to each other, respectively.

13. The display device of claim 12, wherein the first clock signal is for being applied via a first clock signal line, and the second clock signal is for being applied via a second clock signal line.

14. The display device of claim 3, wherein at least some of the plurality of bumps are for being electrically connected to each other, and wherein the plurality of bumps have a same thickness.

15. The display device of claim 1, wherein the first start signal and the second start signal are for being applied via different signal lines, respectively.

16. The display device of claim 1, wherein the first clock signal or the second clock signal includes a plurality of clock signals having different phases.

17. The display device of claim 16, wherein the plurality of clock signals are for being applied via a plurality of different clock signal lines, respectively.

18. The display device of claim 17, wherein at least some of the plurality of different clock signal lines are adjacent to each other to constitute a pair.

19. The display device of claim 1, wherein the at least one scan driver includes a plurality of scan drivers configured to output a plurality of different scan signals, respectively.

20. The display device of claim 19, wherein the at least one scan driver includes a first scan driver, a second scan driver, a third scan driver, and a fourth scan driver.

21. The display device of claim 20, wherein the second scan driver includes second scan drivers, and wherein the second scan drivers are respectively disposed on both opposing sides of the display panel and are configured to apply a same signal to a same pixel row.

22. The display device of claim 21, wherein the second scan driver includes a plurality of odd-numbered scan drivers and a plurality of even-numbered scan drivers, and wherein the odd-numbered scan drivers are respectively disposed on both opposing sides of the display area, the even-numbered scan drivers are respectively disposed on both opposing sides of the display area, and the odd-numbered scan drivers and the even-numbered scan drivers are configured to operate separately.

23. The display device of claim 19, wherein the light-emission control driver is configured to apply a same signal to an odd-numbered pixel row and an even-numbered pixel row.

24. The display device of claim 20, wherein in one side area around the display area, the second scan driver is disposed adjacent to the display area, the fourth scan driver is disposed in an outermost area, and the light-emission control driver is disposed between the second scan driver and the fourth scan driver.

25. The display device of claim 20, wherein in one side area around the display area, the light-emission control driver is disposed in an outermost area.

26. The display device of claim 24, wherein in the other side area around the display area, the second scan driver is disposed adjacent to the display area, the first scan driver is disposed in the outermost area, and the third scan driver is disposed between the second scan driver and the first scan driver.

27. The display device of claim 24, wherein in the other side area around the display area, the third scan driver is disposed in the outermost area.

28. The display device of claim 20, wherein the light-emission control driver, the first scan driver, the third scan driver and the fourth scan driver are disposed on a left or right side of the display area and are configured to supply respective gate signals to the plurality of pixels connected thereto via respective gate lines of the display panel.

29. The display device of claim 20, wherein the light-emission control driver, the first scan driver, the third scan driver and the fourth scan driver are arranged in a symmetrical structure on both opposing sides of the display area and are configured to supply a same signal to respective gate lines of the display panel.

* * * * *